Aug. 4, 1959 A. DAVISON ET AL 2,898,406
TELEPHONE SYSTEMS
Filed April 19, 1957 15 Sheets-Sheet 1

ALAN DAVISON.
LESLIE JOHN ALLEN. Inventors
By Irvin S. Thompson
Attorney

ALAN DAVISON.
LESLIE JOHN ALLEN. Inventors

By Irvin S. Thompson
Attorney

Aug. 4, 1959 A. DAVISON ET AL 2,898,406

TELEPHONE SYSTEMS

Filed April 19, 1957 15 Sheets-Sheet 3

ALAN DAVISON
LESLIE JOHN ALLEN
Inventors

By Irvin S. Thompson
Attorney

Aug. 4, 1959 A. DAVISON ET AL 2,898,406

TELEPHONE SYSTEMS

Filed April 19, 1957 15 Sheets-Sheet 4

ALAN DAVISON.
LESLIE JOHN ALLEN. Inventors

By Irvin S. Thompson
Attorney

Aug. 4, 1959 A. DAVISON ET AL 2,898,406

TELEPHONE SYSTEMS

Filed April 19, 1957 15 Sheets-Sheet 5

ALAN DAVISON.
LESLIE JOHN ALLEN. Inventors

By Irvin S. Thompson
Attorney

Aug. 4, 1959 A. DAVISON ET AL 2,898,406

TELEPHONE SYSTEMS

Filed April 19, 1957 15 Sheets-Sheet 6

ALAN DAVISON.
LESLIE JOHN ALLEN. Inventors

By Irwin S. Thompson
Attorney

ALAN DAVISON.
LESLIE JOHN ALLEN. Inventors
By Irvin S. Thompson
Attorney

ALAN DAVISON.
LESLIE JOHN ALLEN. Inventors
By Irvin S. Thompson
Attorney

ALAN DAVISON.
LESLIE JOHN ALLEN. Inventors
By Irwin S. Thompson
Attorney

Aug. 4, 1959 A. DAVISON ET AL 2,898,406

TELEPHONE SYSTEMS

Filed April 19, 1957 15 Sheets-Sheet 10

REG1

ALAN DAVISON.
LESLIE JOHN ALLEN.
Inventors

By Irwin S. Thompson
Attorney

ALAN DAVISON.
LESLIE JOHN ALLEN. Inventors
By Irvin S. Thompson
Attorney

ALAN DAVISON.
LESLIE JOHN ALLEN. Inventors
By Irwin S. Thompson
Attorney

ALAN DAVISON
LESLIE JOHN ALLEN Inventors
By Irwin S. Thompson
Attorney

Aug. 4, 1959 A. DAVISON ET AL 2,898,406

TELEPHONE SYSTEMS

Filed April 19, 1957 15 Sheets-Sheet 14

ALAN DAVISON.
LESLIE JOHN ALLEN. Inventors

By Irvin S. Thompson

Attorney

ALAN DAVISON
LESLIE JOHN ALLEN
Inventors
By Irwin S. Thompson
Attorney

United States Patent Office 2,898,406

Patented Aug. 4, 1959

2,898,406

TELEPHONE SYSTEMS

Alan Davison and Leslie John Allen, Liverpool, England, assignors to Automatic Telephone & Electric Company Limited, Liverpool, England, a British company Application April 19, 1957, Serial No. 653,938

Claims priority, application Great Britain April 28, 1956

12 Claims. (Cl. 179—18)

Figure 1:
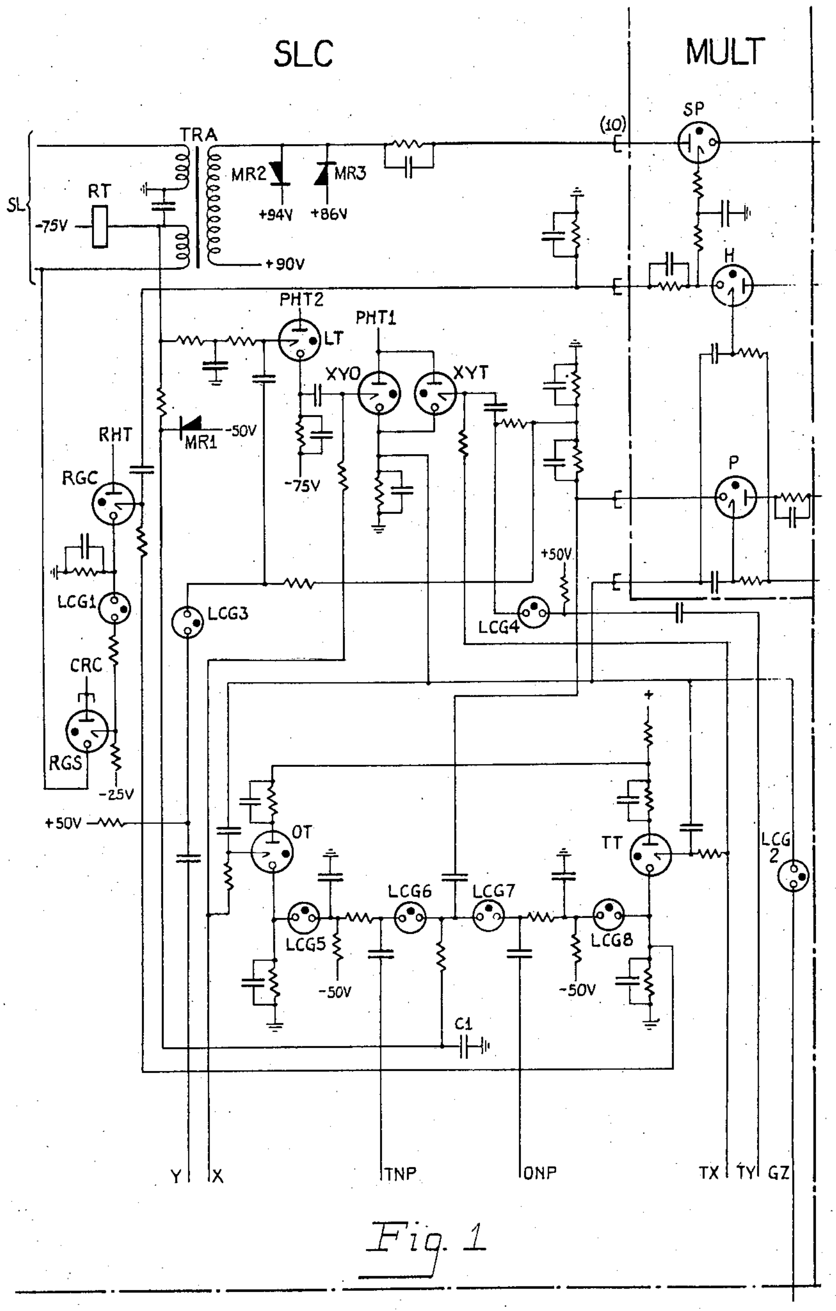
Figure 2:
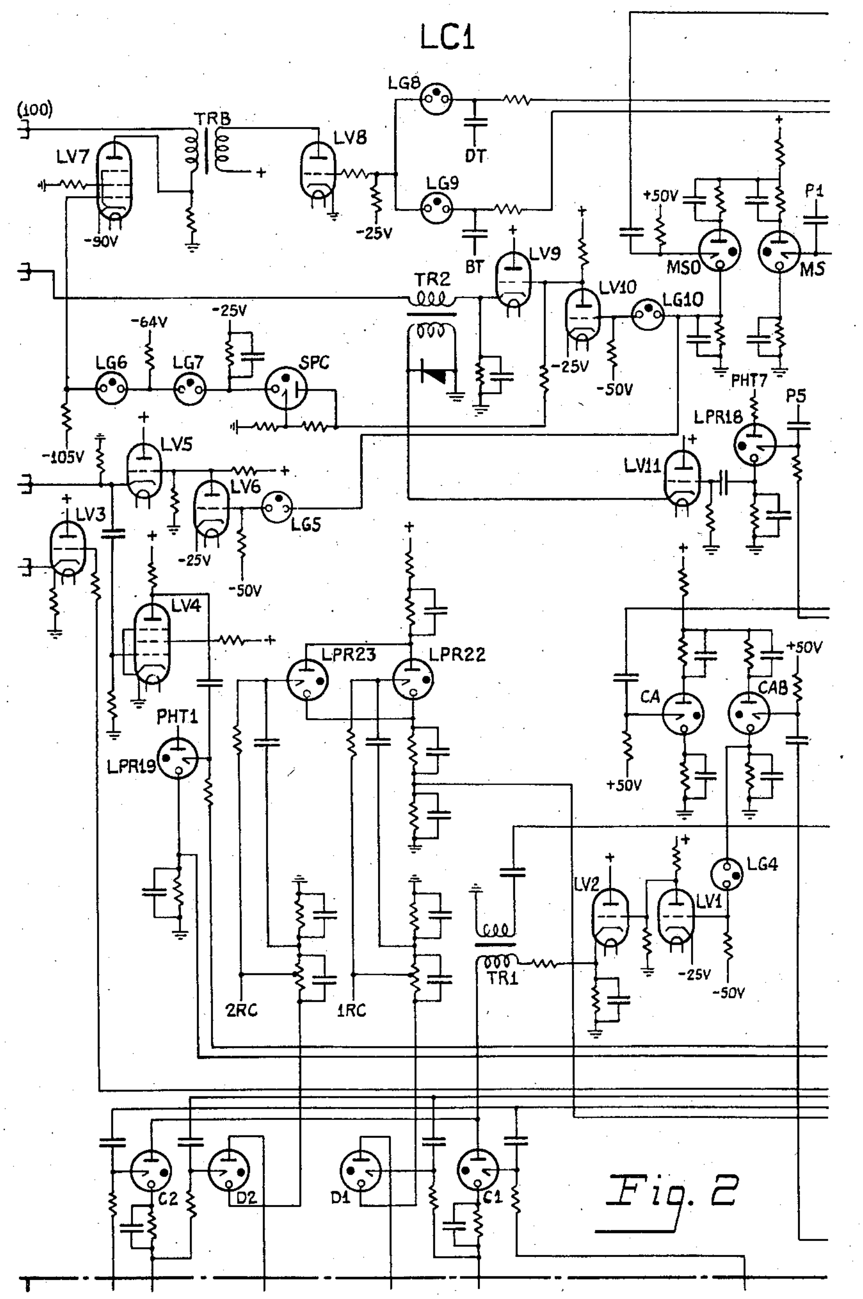

The present invention relates to telephone systems and is more particularly concerned with systems employing static switching devices for the setting up and supervision of connections between calling and called subscribers.

Systems of this particular type are well known and have taken a number of forms. Those disclosed in our prior United States Patent No. 2,722,567 and British Patent No. 735,635 employ gas discharge tubes of the cold cathode type and thermionic tubes as the static switching devices and in particular sets of gas discharge tubes are employed for completing the conversational and control paths between calling and called subscribers.

Further in specification No. 735,635 these tubes are formed into a multiple, one side of each set of tubes being multipled to subscribers' lines while the other side is multipled to equipment for controlling the setting up of connections.

With such an arrangement it has been found necessary to distinguish in a multiple accessible to subscribers' lines whether a connection extending from a subscriber's line through the multiple was set up as a result of an originating connection from or a terminating connection to the subscriber's line. In the prior arrangement this was effected by the provision of separate tubes in each set, one of said tubes being rendered conducting on an originating connection while the other was rendered conducting on a terminating connection. Pulses for effecting supervisory control of the connection were transmitted from a common source through a particular conducting tube in each of the sets associated with the calling and called lines.

The main object of the present invention is to provide improved arrangements for distinguishing between originating and terminating connections whereby an economy is effected in the number of tubes employed in the multiple.

According therefore to the invention, in a telephone system employing sets of static switching devices through which conversational and control paths are extended from subscribers' line circuits on the striking of the appropriate sets of static switching devices, two sources of pulses having different characteristics are provided in common to all the sets of static switching devices and on the striking of a set of static switching devices to extend the conversational and control paths from a subscriber's line circuit, one or other of said sources according as to whether said line circuit is in an originating or a terminating condition is connected to one of the conducting devices of said set, the connection of the different sources to said device serving to effect controls appropriate to the different conditions of the line circuit.

According to one aspect of the invention, in a telephone system employing sets of static switching devices through which conversational and control paths are extended from subscribers' line circuits on the striking of the appropriate sets of static switching devices, gating arrangements are provided which, on the striking of a set of static switching devices to extend the conversational and control paths from a subscriber's line circuit, are opened non-coincidentally to enable one or other of two different signals according as to whether said line circuit is in an originating or a terminating condition, to be transmitted through one of the conducting devices of said set, the transmitted signal being applied to further gating arrangements which pass the signal to one or other of two circuits for exerting the controls appropriate to the condition of the line circuit.

According to another aspect of the invention, in a telephone system having a plurality of link circuits provided in common to all subscribers' line circuits and having multipled to each line circuit a plurality of sets of static switching devices equal in number to the number of link circuits, a connection between a calling subscriber's line circuit and a called subscriber's line circuit being effected by causing the conduction of a set of static switching devices for each line circuit, two sources of non-coincident pulses are provided in equipment common to all the sets of tubes and are connected to two gating devices which are included in each line circuit and which are so controlled that on the conduction of a set of static switching devices to connect a subscriber's line circuit to a link circuit, one or other of said sources according as to whether said line circuit is in an originating or a terminating condition is connected through the appropriate gating device and one of the conducting devices of said set and to two further gating devices in said link circuit, said further gating devices being so arranged as to complete a path to one or other of two circuits for exerting the controls appropriate to the condition of the line circuit.

According to a further aspect of the invention, in a telephone subscriber's line circuit provided with a plurality of sets of static switching devices to enable a terminating or originating connection to be extended to or from the line circuit on the conduction of the static switching devices of one set, the line circuit includes two gating circuits to which two series of pulses having different characteristics are applied and the gating circuits are so controlled that one or other is opened according to whether the line circuit is in an originating or a terminating condition, the opening of either gating circuit allowing the appropriate series of pulses to pass therethrough and through one of the switching devices of the set of conducting devices to effect controls appropriate to the condition of the line circuit.

Figure 17:
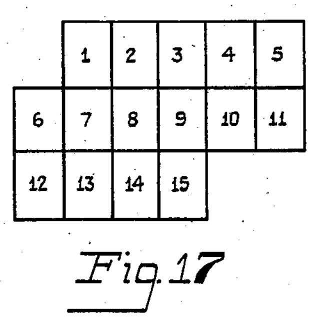
Figure 16:
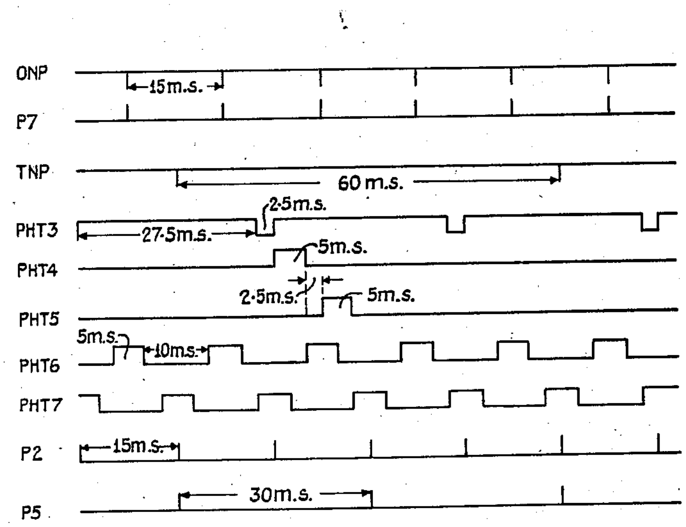
Figure 14:
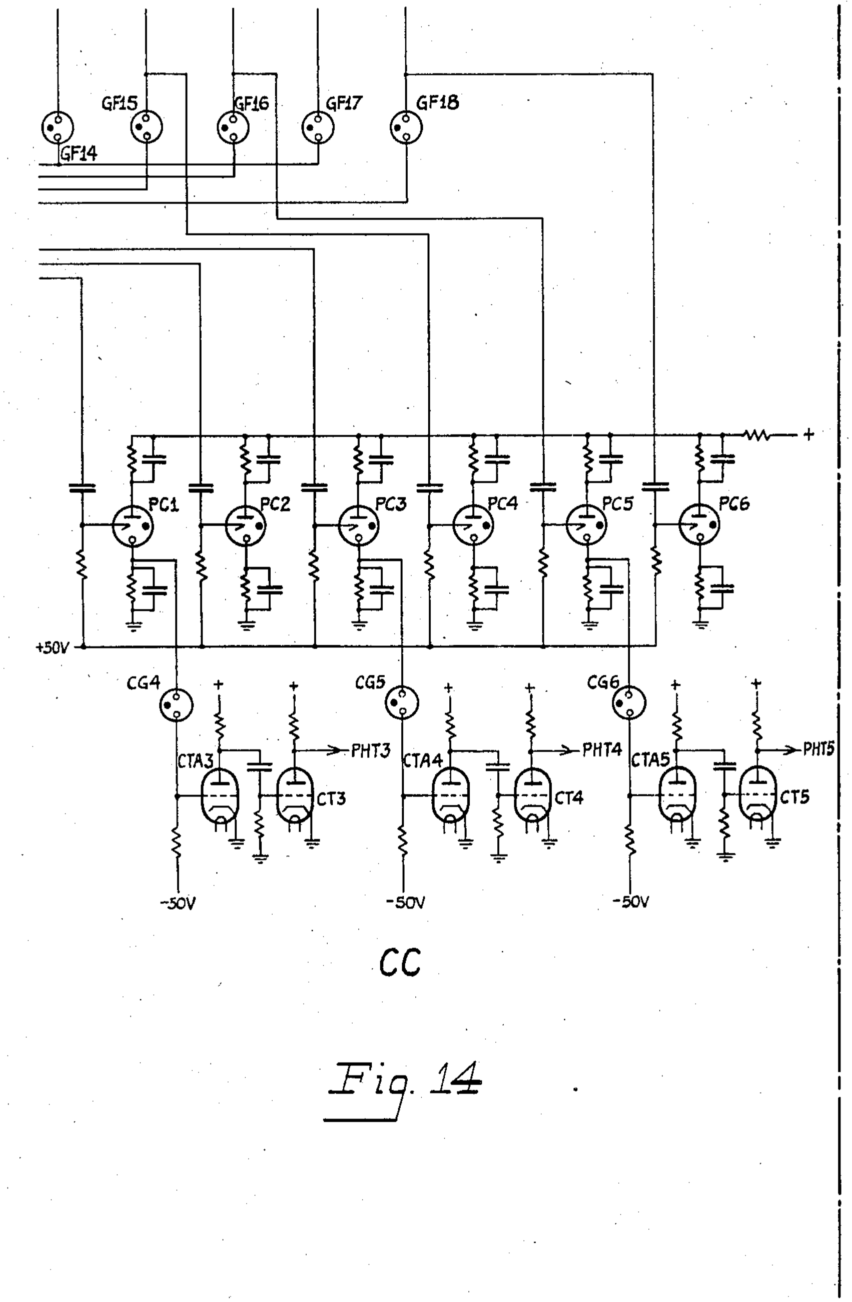
Figure 15:
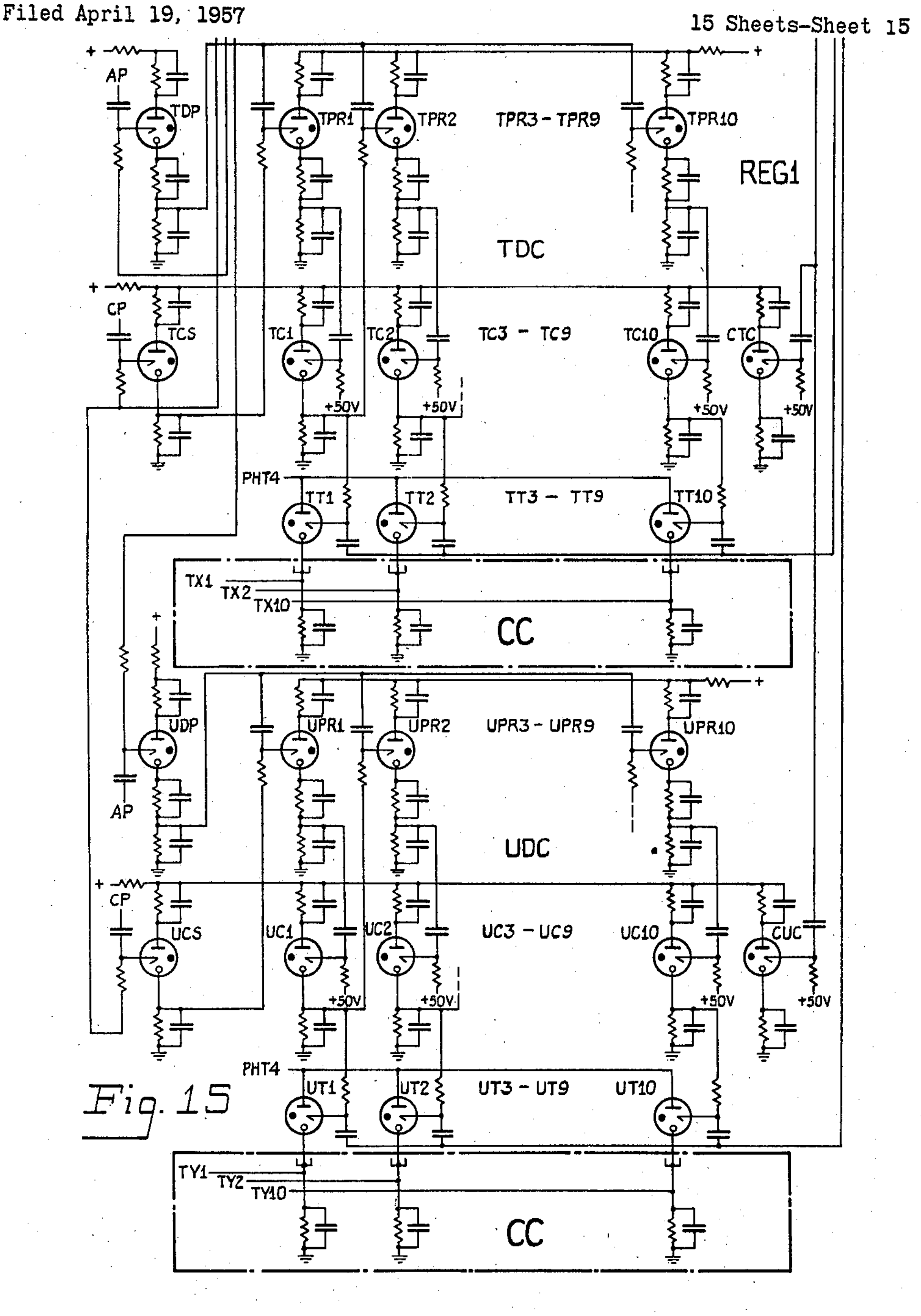

The invention will be better understood from the following description of the preferred embodiment which should be read in conjunction with the accompanying drawings. Of the drawings Figs. 1 to 15, arranged in accordance with Fig. 17, form the circuit of a 100 line private electronic telephone exchange, whereas Fig. 16 shows the time relationship of various pulse and pulsed high-tension sources which are used in the exchange. In the circuit a typical subscriber's line circuit is designated SLC and the first of the ten link circuits LC1 to LC10 is represented. Of the two registers REG1 and REG2 which are employed, the first is shown in its entirety. The remaining parts of the circuit carrying the reference CC, form the common control equipment which incorporates the register allotter RA, the link circuit allotter LCA and the subscribers' line circuit scanning arrangements together with pulse generating means and other elements which are common to the exchange.

GENERAL

The 100 subscribers' line circuits SLC have access to each of the ten link circuits LC1 to LC10, and for this purpose each line circuit is terminated upon a particular ten sets of three tubes SP, H and P in the so-called multiple Mult, each set extending to a different link circuit.

One hundred such sets of tubes, one for each subscriber, are connected at common points in each of the link circuits. Thus the multiple has 3000 tubes altogether, and of these the SP tubes are for speech path switching, the P tubes are used for the transmission of supervisory and control signals from calling and called line circuits to the link circuits, and are moreover used for guarding busy line circuits, whereas the H tubes are employed for the passage of signals from the link circuits for the control of application of ringing currents to called subscribers' lines. A connection between two subscribers involves two sets of fired multiple tubes, one for each subscriber, both sets converging upon common points in a link circuit.

The subscribers' line circuits, which are numbered from "11" to "00," are arranged in a ten-by-ten coordinate manner, according to their tens and units digits, for scanning and marking purposes, each line circuit being provided with a pair of leads for each purpose. Scanning of the line circuits is performed by means within the common control equipment in order to singularise any line circuit which is originating a call, and thereby to condition the line circuit to fire that set of multiple tubes which connects it to the pre-allotted link circuit. A so-called "Z" pulse produced by the common control equipment in consequence upon singularisation of the calling line circuit, effects seizure of the allotted link circuit. The scanning arrangements comprise a twelve-stage fast scanner FS and a ten stage slow scanner SS, both of the ring type, of which the former, operating at 40 stages per sec., advances the latter one stage for each cycle of operations of the former. A complete scanning cycle, embracing all 100 line circuits, involves ten cycles of the fast scanner and the consequent single cycle of the slow scanner. An operative stage of the slow scanner connects a bias potential to one of the scanning leads of ten line circuits having the same tens digit and while this persists the twelve stages of the fast scanner become operative successively, ten of the stages of the latter, each in its proper time, connecting a pulse potential to a second scanning lead of ten line circuits having the same units digit. Each line circuit is separately scanned when a pulse and a bias potential are present upon it.

The scanning arrangements are additionally concerned in the generation of various pulse and pulsed H.T. supplies which are essential to the operation of the exchange.

All the subscribers' line circuits have two sources of recurrent pulses connected to them, the pulses of one source, so-called originating negative pulses, being repeated to the link over the P tube of the multiple by an originating (calling) line circuit, whereas the pulses of the other source, so called negative terminating pulses, are repeated to the link, also over a P tube from a terminating (called) line circuit. The repetition of said pulses is effective only in the presence of a line loop condition at the relevant line circuit. When a connection has been established between two subscribers both types of repeated pulses are applied to a common lead in the relevant link circuit but since the pulses are displaced with respect to each other, separate gating means within the relevant link circuit enable them to be separately detected, and so the loop conditions of the line circuits are effectively monitored. It is to be noted that in the process of setting-up a call, the loop "break" periods occurring during dialling, effect interruptions of the outgoing negative pulse sequence, the number of such interruptions signifying the digit dialled. Moreover a persistent interruption of said pulses is indicative of the caller having cleared and would result in the generation of a "B" pulse by the link circuit to bring about release of the equipment. The terminating negative pulses are particularly concerned, upon their connection to a link circuit, in indicating that the called subscriber has answered and as a result ringing of that subscriber would cease.

As regards the marking and consequent singularisation of a called subscriber's line circuit, this is accomplished on a one-at-a-time basis under control of that one of the two registers which is taken into use by the link circuit seized by a calling subscriber. The marking is of coordinate form, a bias potential being first connected to one marking lead of the ten line circuits having the tens digit of the dialled number, and while this is present another potential is applied to a second marking lead of ten line circuits having the dialled units digit. The coordinate marking of an idle line circuit brings about the firing of a set of multiple tubes relevant to the line circuit and also to the link circuit to which the calling party is already connected.

The link circuit allotters and the register allotters, LCA and RA respectively, incorporated in the common control equipment perform their allotting functions on a cyclic basis, and when the pre-allotted link circuit is seized by a calling subscriber, a two-conductor path is established to the pre-allotted register by way of a pair of tubes C1 and D1 or C2 and D2 according to the register concerned. The first tube of the particular pair is concerned with the transmission of line intelligence, e.g. dialled digital information, emanating from the calling line circuit whereas the second tube is concerned with the transmission of control signals in the reverse direction i.e. from the register to the link circuit. The control signals signify the prevailing condition of the register in the process of the setting-up of the call. These step-by-step conditions are recorded in a sequence control counter RSCC in the register, and the resultant control signals are recorded upon a sequence control counter LSCC within the link circuit also to signify the progress of the call. Thus for instance, when means in the register which is responsive to calling line intelligence, i.e. the "A" and "C" pulse element ACG, has been connected to the link circuit, a control signal, derived from the register sequence control, so sets the link sequence control that it causes dial tone to be returned to the caller. Likewise the reception of the dialled digit is signified to the link circuit.

The register incorporates two cold-cathode tube type counters TDC and UDC which are for storage of dialled tens and units digits respectively. When two digits, each signified by a number of "A" pulses produced by element ACG under control of the calling line intelligence signals, have been stored in the register, its sequence control counter determines that the fast scanner shall be extended by six stages. This extension circuit has no scanning function, but whilst it is being traversed, at 400 stages per minute, it allocates distinct time periods for each of the two registers. It is within a particular one of these periods that the register having stored the full complement of digits, is conditioned to transfer a marking to the called line circuit. At the same time, the link circuit associated with the register primes the relevant 100 sets of multiple tubes, preparatory to one set being fired if the line circuit marked is idle. The allocation of time periods for the registers, in the circumstances mentioned, ensures that two registers which are ready at the same time to mark called line circuits become operational in rapid succession without any possibility of the called line circuits being connected to the wrong link circuits. The fast scanner reverts to normal twelve-stage operation when the extension stages have been traversed.

When an idle called line circuit is marked, besides a path being established between the line circuit and the link circuit, the former causes the common control equipment to produce a so-called "Z" pulse whereby the release of the register is initiated, the latter meantime passing a control signal to the sequence control in the link circuit. As a result of the signal the link circuit causes the subscriber's bell to be rung under control of pulses transmitted over the H tube to the line circuit. The ringing is tripped when the called party duly answers, by an "F" pulse generating element FG, in the link circuit.

When a busy subscriber's line circuit is marked by a register the marking is ineffective and no "Z" pulse is forthcoming in the time period allocated to the register. Therefore the busy indicating stage of the link circuit becomes operative after a short period to return busy tone to the caller and moreover the link circuit releases the register.

A detailed description will now be given of the operation of the exchange with reference to the circuits shown in the drawings.

*Link circuit allotter.*—The common control equipment CC incorporates the link circuit allotter LCA (Fig. 11) which comprises a ten-stage counter, one stage for each link circuit. Tubes AL1 to AL10 are the counting tubes which are arranged in a mutually extinguishing manner. An additional tube AAL1, in parallel with tube AL1, is provided and is fired by a start pulse over lead SP after power has been initially connected to the exchange. Tube AAL1 is extinguished when a regular counting tube is duly fired and after that it remains inoperative. Each of the count tubes AL1 to AL10 has a self-extinguishing pulse repeater tube RAL1 to RAL10 associated with it, and the function of these tubes is to pass a firing pulse to the count tube of the next stage, the output of the last repeater tube being connected to the input (trigger electrode) of the first count tube AL1 to complete the counting ring. Driving pulses for the pulse repeater tubes are derived from the thermionic tube VTAP which together with thermionic tubes VTALB and VTLAS and the cold-cathode tubes CG1, CG2, CG3 and RAP form the controlling circuit for the allotter.

Now each of the link circuits LC1 to LC10 contains a link sequence control counter LSCC, and this includes a series of counting tubes FR, ALL, SZ (Fig. 3), and so on arranged in a mutually extinguishing manner together with pulse repeater tubes LPR1, LPR2 and so on, certain of the latter being arranged to exercise control on certain of the former. The fired state of a counting tube in a particular link circuit is indicative of the prevailing condition of that circuit. Thus, tube FR when conducting indicates that the link circuit is idle and not allotted, whereas tube ALL when conducting signifies that the circuit has been allotted for use on the next call to be originated. Finally tube SZ when conducting indicates that the link has initially been taken into use by a caller.

The tubes FR of idle and unallotted link circuits are each fired due to the momentary firing of a tube LPR1 as the particular link circuit becomes free. Tube FR renders the diode LG11 conducting, −50 volts being provided over a resistor associated with the grid circuit of tube VTALB.

Now leads A(LC1), A(LC2) . . . A(LC10) (Fig. 11) extending from the cathodes of counting tubes AL1, AL2 . . . AL10, in the link circuit allotter LCA, are connected respectively to leads A (Fig. 3) in link circuits LC1 to LC10 so that the individual count tube, which happens to be conducting, serves to prime tube LPR2 in the corresponding link circuit, in addition to priming the relevant one of pulse repeater tubes RAL1 to RAL10 in the allotter. Lead APL of the allotter is common to a similarly designated lead in every link circuit, the latter lead extending over a capacitor to the trigger electrode of tube LPR2.

Under the normal operating conditions of the exchange, several link circuits will be idle and unallotted with tube FR fired, a single one will be idle and allotted with tube ALL fired, and possibly others will actually be in use and will have neither of these tubes fired. When the allotted link circuit is initially seized, as it is when a call is initiated, tube SZ is fired so that tube ALL together with the diode tubes LG12 and LG13 are extinguished. Since the tube LG11, in at least one other link circuit, is fired, the extinguishing of tube LG13, as at present, does not alter the normally conducting condition of thermionic tube VTALB in the allotter controlling circuit, and therefore tube CG1 in the latter circuit remains non-conducting, as also does tube CG2 even though the backing-off voltage is removed from the cathode by the extinguishing of tube LG13 in the newly seized link circuit. However the extinguishing of tube LG13 also lowers the potential at the grid of tube VTLAS which is cut off to cause tube CG3 to conduct, and this primes the pulse repeater tube RAP. The trigger electrode of the latter tube is fed with positive pulses (400 p.p.s.) from a common source P1, while the anode is supplied with coincidental high-tension pulses from the common pulsed H.T. source PHT1. Tube RAP is therefore fired and accordingly a positive potential is applied to common lead APL, and also over individual capacitors to the trigger electrodes of tubes RAL1 to RAL10 of the allotter.

In the allotter, the count tube (AL1 . . . AL10) immediately following that which is associated with the link circuit previously allotted and now seized, is in the fired condition, and therefore the relevant pulse repeater tube RAL1 . . . RAL10 will be primed from its cathode. Accordingly the positive pulse now appearing at the trigger electrode of the latter tube due to conduction of tube VTAP causes the primed repeater tube to fire, and this strikes the next count tube which initiates de-ionisation of the count tube of the preceding stage. Meanwhile the self-extinguishing pulse-repeater tube LPR2 (Fig. 3) in the corresponding link circuit alone is primed over lead A, and the pulse extending from lead APL causes the particular tube LPR2 to be fired. This applies a pulse to tube LPR3 which will be primed or not, from tube FR, according to whether the link circuit is idle or busy.

Assuming that the link circuit is idle, tube LPR3 fires momentarily and causes the permanently primed tube ALL to fire, and therefore LG12 and LG13 are rendered conducting. Tube ALL, which signifies that the link circuit is available for use on the next originated call, also extinguishes tube FR which de-ionises its dependent diode LG11. Tube LG12 maintains tube VTALB (Fig. 11) conducting in the event of no other link circuits being idle, whereas tube LG13 again applies the backing-off potential to tube CG2 and causes tube VTLAS to conduct again. Therefore tube CG3 is extinguished and disables tube RAP so that no further driving pulses are delivered by tube VTAP.

If the link circuit had been busy when tube LPR2 was fired, tube LPR3 would have remained unfired and likewise tube ALL and tubes LG12 and LG13. Therefore tubes VTLAS and CG3 would have remained non-conducting and conducting respectively, so that another pulse would duly be delivered by tube VTAP under control of tube RAP, the pulse being effective in firing tube LPR2 in the next link circuit in the sequence and in initiating the advancement of the allotter by one stage. The whole process of testing the link circuits cyclically and advancing the allotter continues in the manner described until an idle link circuit is encountered. In all events, when an idle link circuit has been allotted the condition of the allotter is such that the count tube corresponding to the next link circuit (idle or busy) in the sequence is fired to prime tube LPR2 therein over the relevant lead A.

When tube ALL fires in the allotted link circuit, it connects a priming potential to tubes MS (Fig. 2), LPR4 and PPH (Fig. 5) in said circuit. Tube MS fires on the occurrence of the next P1 (400 p.p.s.) pulse and extinguishes tube MSO which extinguishes the diodes LG5 and LG10. Thereupon thermionic tubes LV6 and LV10 are cut-off, whereas tubes LV5 and LV9 are rendered conducting and so respectively provide H.T. for the anodes of the P and H tubes (100 of each) in the multiple. Also with tube LV10 cut-off, tubes SPC, LG7 and LG6 are fired, the latter raising the potential at the control grid of tube LV7 to above cut-off to provide a negative potential at the cathodes of the 100 SP tubes.

Tube PPH (Fig. 5) has its anode fed from a source of pulsed high tension, PHT3, extending from the common equipment, the arrangements being that H.T. is only interrupted once (for some 2.5 ms.) at the end of each normal sequence of operations of the high-speed (units digits) scanner associated with the subscribers' line circuits. Since lead PHT3 is also associated with the trigger electrode of tube PPH, by way of a network involving capacitors, resistors and a rectifier, it will be apparent that tube PPH (in the allotted but idle link circuit) will be conducting during each complete H.T. period. The rectifier is included to absorb negative potentials developed in the network. When tube PPH is conducting the positive potential developed at its cathode renders the thermionic tube LV3 (Fig. 2) conducting, and this primes the 100 pairs of tubes P and H in the access paths to the link circuit from the 100 subscribers' line circuits, such as SLC. It follows that when line circuits are being scanned to detect the initiation of a call, said P and H tubes are primed preparatory to connecting a calling line circuit to the link circuit.

When a subscriber's line circuit initiating a call is scanned, it produces a condition whereby a so-called "Z" pulse is developed by the common control equipment. This positive pulse is applied to lead ZP (Fig. 3) of all the link circuits and thence to the trigger electrode of tube LPR4 in the link sequence control counter. In the allotted link circuit alone, self-extinguishing tube LPR4 is already primed due to the fired state of tube ALL, and is now struck by the "Z" pulses, the firing of the tube being assured since it derives its anode potential, like tube PPH, from the source PHT3.

The firing of tube LPR4 initiates other functions principally concerned with connecting the seized link circuit with the allotted register, but only its striking of the permanently primed tube SZ has relevance to the link circuit allotter. Upon conduction of tube SZ, tube ALL is extinguished. Also the relatively positive potential obtaining at the cathode of tube SZ primes tube LPR5, and is applied to a 5 secs. delay circuit associated with the trigger of tube LPR9. Upon the de-ionisation of tube ALL, the priming potential is removed from tubes LPR4 and PPH, and moreover tubes LG12 and LG13 in the link circuit are extinguished.

If there remains one or more link circuits idle, the diode tube LG11 will be conducting and the extinguishing of tube LG12 in the newly seized link circuit is without effect, i.e. the "all links busy" tube VTALB remains conducting, the converse being the case if none of the link circuits are idle. In the former case sequential testing of the link circuits by the allotter, proceeds until an idle one has been allotted.

*All link circuits busy.*—When the last available link circuit has been allotted and seized, tubes LG12 and LG13 associated with tube ALL in said circuit are extinguished. Since no link circuits will be in the idle but unallotted condition, the relevant tubes LG11 will be non-conducting, and therefore the "all links busy" tube VTALB is cut-off. As a result the diode CG1 conducts to raise the potential applied to tube CG2. With no link circuit tube LG13 conducting, CG2 is not backed-off and therefore conducts to cause tube VTLAS to conduct. With tube VTLAS conducting, no allotter driving pulses are developed by tube VTAP, nor are testing pulses applied to the link circuits.

When a link circuit becomes idle after the "all links busy" condition, the tube LG11 therein is struck by tube FR. Consequently tube VTALB conducts and tube CG1 is extinguished. The latter extinguishes tube CG2 which cuts-off tube VTLAS so that the allotter controlling circuit is thus conditioned to enable the idle link circuit to be allotted, whereupon tube ALL in that link circuit is fired, and tube FR extinguished. Tube LG12, being fired in place of tube LG11, maintains tube VTALB conducting. Since tube LG13 is also fired, tube VTLAS conducts to stop further advancement of the allotter. The allotter is finally conditioned to have the count tube fired which relates to the link circuit succeeding that which has been allotted.

*Register allotter.*—The register allotter RA (Fig. 8) is incorporated in the common control equipment CC and comprises the thermionic tube VTBRB and cold cathode tubes R1, RR1, R2, RR2 and ARR1. When one or both of the registers is idle tube VTBRB is non-conducting, and according to whether register REG1 or REG2 has been pre-allotted tube R1 or R2 is conducting respectively. Each of the ten link circuits has a pair of register-connector tubes C1 and D1 for establishing connections to register REG1, and another pair of similar tubes C2 and D2 for register REG2.

If the first register has been allotted a positive potential obtaining at the cathode of tube R1 primes tube C1 in each of the ten link circuits. When a link circuit is subsequently taken into use by a calling subscriber, a positive firing pulse is applied to the trigger electrode of the relevant C1 tube, and this tube is effective in the allotter, in that a positive potential from its cathode load serves to prime the self-extinguishing pulse repeater tube RR2. The latter is fired from the 400 p.p.s supply P1, and if the second register is idle, tube RR2 fires the permanently primed tube R2 which thereupon primes tube C2 in each link circuit, so that the next link circuit taken into use will cause its particular C2 tube to fire. The striking of tube R2 extinguishes tube R1 by the mutually extinguishing process.

Tube C2, upon being fired, causes tube RR1 to be rendered conducting momentarily by a P1 pulse, and, if register REG1 is again idle, tube R1 is fired to prime the tube C1 in each link circuit and to extinguish tube R2 so that the priming condition is removed from the tubes C2.

Tube ARR1 in the allotter is only operational when the power supply is initially connected to the exchange, whereupon a positive pulse, applied to the start pulse lead SP, fires the tube which has its main gap in parallel with that of tube RR1. The effect is the same as that produced by the firing of tube RR1 in that tube R1 is struck to allot register REG1. When this register is subsequently taken into use and register REG2 allotted, tube ARR1 is extinguished and does not enter into the normal operation of the allotter.

*Both registers busy.*—When both registers are busy, a C1 tube in one link circuit and a C2 tube in another will be conducting. Under these circumstances both of tubes RR1 and RR2 remain primed, and under control of pulse source P1 proceed to conduct alternately. Moreover the potential at the mid-point of the resistance network connecting the common cathode load of the C1 tubes with that of the C2 tubes is raised to a value which causes thermionic tube VTBRB to conduct. Therefore the anode potential available to tubes R2 and R1 in the allotter is insufficient to support conduction of either of them and they remain extinguished even though they receive pulses at the triggers.

When one of the registers becomes idle as indicated by the extinguishing of tube C1 or C2 the potential at the grid of tube VTBRB is reduced to cut-off to re-apply H.T. to tubes R1 and R2, and the priming potential is removed from the appropriate one of tubes RR1 and RR2 to make it non-responsive to P1 pulses. However when the remaining tube of the latter pair fires for the last time, it renders the appropriate one of tubes R1 and R2 conducting and accordingly the ten C1 or C2 tubes in the access paths to the idle register are primed.

*Subscribers' line circuits and multiple.*—Each of the 100 subscribers' line circuits such as SLC has access to the ten link circuits LC1 to LC10, and for this reason each line circuit is connected to ten sets of tubes SP, H and P in the so-called multiple MULT, one set for each link circuit. To provide for 100 subscribers' line circuits, 1000 sets of multiple tubes are employed and it will be apparent that 100 sets of tubes, one for each subscriber's line circuit, are terminated upon each link circuit. The function of each tube SP in the multiple is to complete a single-conductor speech path between a subscriber's line circuit and a link circuit, the speech path involving transformers TRA and TRB in these circuits respectively. The H and P tubes are used for signalling and control purposes.

In order to facilitate singularisation of a subscribers' line circuit initiating a call or of a subscriber's line circuit to which a call is to be extended, the line circuits are coordinately arranged with respect to their directory numbers which range from "11" to "00." Thus to cater for call originations, lead X of line circuits having the same tens digit are connected together and to a distinctive point (X1 to X10) in the slow scanner SS of the common control equipment, whereas leads Y of the line circuits are grouped according to the units digits and each group connected to a separate point (Y1 to Y10) in the fast scanner FS. The leads TX and TY of the line circuits are concerned with call terminations and again these conductors are grouped respectively according to the tens and units digits of the line circuits, the groups being connected to appropriate marking or transfer tubes associated with the tens and units digits counters in the two registers REG1 and REG2 serving the exchange.

Now the scanning equipment in the common control circuit is continuously operating and the slow scanner therein advances one stage for each complete cycle of operations of the fast scanner. Each of the ten stages of the slow scanner is operative in turn in applying a positive biasing potential to lead X of a line circuit group having a particular tens digit denomination and while this condition perists, each of ten stages of the high-speed scanner becomes operative singly and successively, the operative stage applying a positive pulse to the Y lead of the line circuit group having the relevant units digit denomination. Thus in one operational cycle of the slow scanner each of the 100 line circuits is effectively separately scanned by a bias potential and pulse potential being applied to it over leads X and Y respectively. It may be mentioned that Y pulses are distributed by the scanning equipment at 2.5 ms. intervals, except for an interval of 7.5 ms. between the pulses applied to the "0" and "1" units digits groups of line circuits, the complete scanning cycle taking approximately 300 ms. since the fast (Y) scan is repeated ten times for one cycle of the slow (X) scan.

In the normal course of events tubes OT and LCG5 (Fig. 1) or tubes TT and LCG8 will be conducting, according to whether the subscriber's line circuit was last employed for a call origination or for a call termination respectively. When the line circuit is not in use the diode tube LCG3, which shares a cathode load with the ten P (multiple) tubes relevant to the line circuit, is fired by each pulse applied to lead Y by the scanning equipment.

*Subscriber calling.*—When the subscriber initiates a call, the loop applied to the line SL is extended to windings of transformer TRA to complete a circuit, involving retard RT, between earth and −75 v. with respect to earth. The potential derived from the retard is extended to the trigger electrode of tube LT to make it sufficiently positive to prime tube LT, its cathode being at −75 volts. The anode of tube LT is fed from a source of pulsed high tension PHT2 (400 p.p.s.) in the common control circuit. The potential derived from the retard is also applied to the junction of diodes LCG6 and LCG7. It is to be noted that rectifier MR1 is included so that when the line is not looped −50 volts (not −75 volts) is present at said junction so that neither tube will conduct even thought tube LCG5 or LCG8 is conducting. Capacitor C1 is included to absorb any transient line potentials which may occur.

Now each pulse applied to the lead Y (units digit) of the line circuit by the scanning equipment, appears when a PHT2 pulse is present, and therefore, after initiation of a call, tube LCG3 continuing to fire due to each "Y" pulse also fires tube LT so that both tubes are repeatedly fired. Each time tube LT fires a positive-going pulse obtained from its cathode is applied to the trigger electrode of tube XYO which like tube OT is primed at appropriate times by the potential applied to lead X (tens digit) by the slow scanner.

Tubes XYO and XYT receive their anode potentials from a source PHT1 (400 p.p.s.) in the common control circuit, the high tension pulses being synchronised with those of source PHT2 but are at a somewhat high voltage. Hence when the particular subscriber's line circuit is co-ordinately scanned, tube XYO fires in addition to tubes LCG3 and LT, tubes XYO and LT each remaining fired for the duration of the relevant H.T. pulse. Upon the firing of tube XYO, a positive pulse is applied from the cathode thereof to the trigger electrodes of tubes OT and TT, the first of which is primed due to the potential at lead X at this juncture. Therefore if tube OT is not already fired this is effected, and tube TT is extinguished since tubes OT and TT are a mutually extinguishing pair. Tube TT in extinguishing would extinguish tube LCG8. If tube OT had already been conducting (as it would be if the line circuit had previously been involved in a call origination) the firing of tube XYO would have been ineffectual. In any event, tube OT being fired causes tube LCG5 to conduct and therefore the gating diode LCG6 is backed-off. It is to be noted that because tube LCG8 is not conducting, tube LCG7 is not backed-off and will be fired each time a negative pulse derived from the common control equipment is duly applied to lead ONP. The negative pulses, which may be referred to as originating negative pulses, occur at 15 ms. intervals and are effectively repeated to the cathodes of the appropriate ten P tubes in the multiple.

Besides ensuring conduction of tubes OT and LCG5, the firing of tube XYO causes tube LCG2 to conduct in a circuit extending over lead GZ to a load in the common control equipment CC, the load being common to tubes such as LCG2 in all line circuits. Tubes VTZA and VTZB are so arranged in the common equipment that tube VTZB is normally conducting. The load of tube LCG2 is connected to the grid circuit of tube VTZA in such a manner that upon conduction of tube LCG2 a positive-going pulse is produced at the grid of tube VTZA to cause said tubes to change their states momentarily. During the period when VTZB is extinguished a positive pulse (a "Z" pulse) is applied to lead ZP. This pulse together with an H.T. pulse from source PHT3 is effective as already described, with respect to the operation of the link circuit allotter, in firing tube LPR4 in the pre-allotted link circuit to effect seizure thereof.

A third outcome of the firing of tube XYO of the line circuit on a call origination, is that a positive pulse is applied to the trigger electrodes of the ten pairs of P and H tubes, in the multiple, relating to the line circuit. It has already been described with respect to the link circuit allotter, that tube PPH (Fig. 5) in the pre-allotted link circuit is in the fired condition at all times when a line is being scanned, and is then operative, through the intermediary of tube LV3, in priming the 100 pairs of P and H tubes, concerned with the particular link circuit. It follows that of these 100 pairs of tubes, one pair alone, relevant to both the link circuit and the calling line circuit, will now be fired due to the trigger pulse produced by tube XYO, and therefore a two-conductor path is established to the link circuit.

Upon tube P being fired, tubes LCG4 and LCG3 are backed-off so as to be unaffected by pulses subsequently appearing at leads TY and Y respectively, the backing-off of LCG4 serving to guard the line circuit against intrusion by another subscriber.

Tubes P and H derive their anode potentials from the cathodes of the conducting thermionic tubes LV5 and LV9 respectively in the link circuit.

The speech tubes SP in the multiple are of a type which is substantially free from "noise," and the particular one which is appropriate to the present connection is fired by the D.C. potential applied to the trigger from the cathode of the fired tube H. The anode and cathode potentials for the speech tube are derived from +90 volts and −90 volts with respect to earth in the line circuit and link circuit respectively, said cathode potential being taken from the anode of the conducting thermionic tube LV7 which also has a connection to earth over a high value resistor. Rectifiers MR2 and MR3 connected to +94 and +86 volts respectively are associated with the anode of tube SP to render it impervious to violent line surges.

To summarise the condition of the calling line circuit prior to the subscriber dialling, tubes AT and LCG5 are fired, and tube LCG7 repeatedly fires due to the originating negative pulses which occur at lead ONP every 15 ms. Pulses are thus extended over tube P to the link circuit for supervisory and control purposes, and each of them results in a negative-going pulse at the cathode of tube LV5. Moreover the fired condition of tube P, in causing the backing-off of diodes LCG3 and LCG4, prevents any marking from the scanner or a register being effective upon the line circuit.

Loop impulsing at 10 i.p.s. is employed for digit transmission by the subscribers, the "break" periods of the dial being nominally 66⅔ ms., and each subscriber is designated by a number in the range "11" to "00." During the dialling of a digit, each "break" in the loop causes tube LCG7 to be biased-back to prevent the passage of at least four possibly five, originating negative pulses to the link circuit, whereas during any intervening 33⅓ ms. "make" two or three such pulses are transmitted, pulse transmission being continuous in the interdigital pauses. The pulses are continuously monitored by a gate circuit (originating pulse gate) in the link circuit, the gating circuit transmitting corresponding pulses to the register which converts the digital information to a form suitable for storage.

*Subscriber called.*—When a register, taken into use by a calling subscriber over a link circuit, has received the two digits defining the called subscriber, it first causes a persistent positive potential to be applied to lead TX (tens digit) and then a positive pulse to be applied to lead TY (units digit) of the relevant line circuit at a time when H.T. (PHT1) is present upon tube XYT. The potential at least TX primes tubes XYT and TT. If the line circuit is idle as evidenced by the unfired state of all ten of the relevant P tubes, tube LCG4 is not backed-off. Tube LCG4 is therefore fired by the pulse at lead TY and serves effectively to repeat the pulse to the trigger electrode of the primed tube XYT which consequently conducts. Thereupon tube XYT extends a positive pulse to the trigger electrodes of the mutually extinguishing pair of tubes OT and TT and since only the latter is primed its conduction will either be produced or confirmed. Tube TT primes the ringing control tube RGC, and renders tube LCG8 conducting so that the gate tube LCG7 (for originating negative pulses) is backed-off. Although −50 volts is applied to tube LCG6, due to tube LCG5 being non-conducting, the transmission of negative pulses (terminating negative pulses) over it from the source TNP must await the answering of the subscriber.

Meanwhile the firing of tube XYT also causes generation of "Z" pulse by the common control equipment, and extends a positive pulse to the trigger electrodes of the ten P and H tubes relative to the called line circuit. The "Z" pulse, in the present circumstances being indicative of the called line circuit having been encountered idle, initiates the release of the register which meantime transmits a signal to the link circuit, whereby the latter subsequently extends pulses over the duly fired H tube (multiple) to the trigger of tube RGC in the line circuit, said pulses recurring at nominally 30 ms. intervals during periods corresponding to the "On" periods of the ringing cycle H.T. (RHT) connected to tube RGC in the line circuit.

The two registers of the exchange are allocated distinct time periods during which each, to the exclusion of the other, may be employed in the marking of a called subscriber's line. During the relevant one of these periods, the link circuit connected to the register concerned in the marking, is conditioned to prime the appropriate 100 P and H tubes in the multiple through the intermediary of tube LV3. It can be seen that a coincidence of biasing and pulsing will occur in the present instance upon one pair of P and H tubes, relevant to both the called line circuit and the link circuit, and these are consequently fired, the latter effecting conduction of the corresponding tube SP.

With tubes SP, H and P fired, the necessary connection is established from the link circuit to the called subscriber, and since the corresponding points in the link circuit are also connected, over a similar set of tubes, to the calling subscriber's line circuit, the two subscribers' line circuits are connected together. With tube P fired, the diodes LCG3 and LCG4 are backed-off so that they are not affected by scanning and marking pulses subsequently appearing at leads Y and TY. Thus tube LT is prevented from firing when the called subscriber eventually answers and tube XYT is prevented from firing in the event of another call being made to the busy subscriber.

It may be mentioned that in the case of a call to a busy subscriber, the failure of tube XYT to fire results in no "Z" pulse being produced by the common control equipment within a prescribed period, and busy tone would be returned to the caller from the link circuit which would also release the register.

Assuming that the called line circuit is idle when marked, its condition after the firing of the set of tubes in the multiple is that tubes TT and LCG8 are fired and the gate tube LCG7 and tube LCG6 are backed-off and likewise tube LCG6. However tube RGC is primed, and has H.T. (RHT) connected to its anode in accordance with the desired ringing cycle (say 0.4 secs. "On," 0.2 secs. "Off," 0.4 secs. "On" and 2 secs. "Off"). Positive pulses (occurring at nominally 30 ms. intervals during the "On" periods of the ringing cycles) are injected into the anode path of tube H and ensure that tube RGC conducts substantially in sympathy with the ringing cycles. Upon conduction, the positive potential at its cathode enables tube LCG1 to conduct for the same periods and during these periods ringing current from the source CRC is transmitted over tube RGS to the called subscriber's bell and thence to the return earth over a winding of transformer TRA. The bell is therefore rung, and moreover ringing current is audible to the calling party.

When the called subscriber answers, tube LT in his line circuit is primed ineffectually and the potential at the junction of tubes LCG6 and LCG7 becomes relatively positive, so that tube LCG6 is fired due to each negative pulse at lead TNP. Therefore when the called subscriber has answered pulses from lead TNP, which may be referred to as terminating negative pulses, are delivered over tube P to the link circuit, wherein they are initially effective in stopping the application of pulses to the H tube in the multiple. Accordingly ringing ceases and the conversation may proceed.

It is to be noted that, for discriminating purposes, the originating negative pulses delivered to the link circuit by the calling line circuit, and occurring at 15 ms. intervals, are displaced with respect to the terminating negative pulses delivered by the called line circuit, the latter pulses occurring at nominally 60 ms. intervals, although intervals of 75 and 90 ms. will occur in some circumstances.

Figure 13:
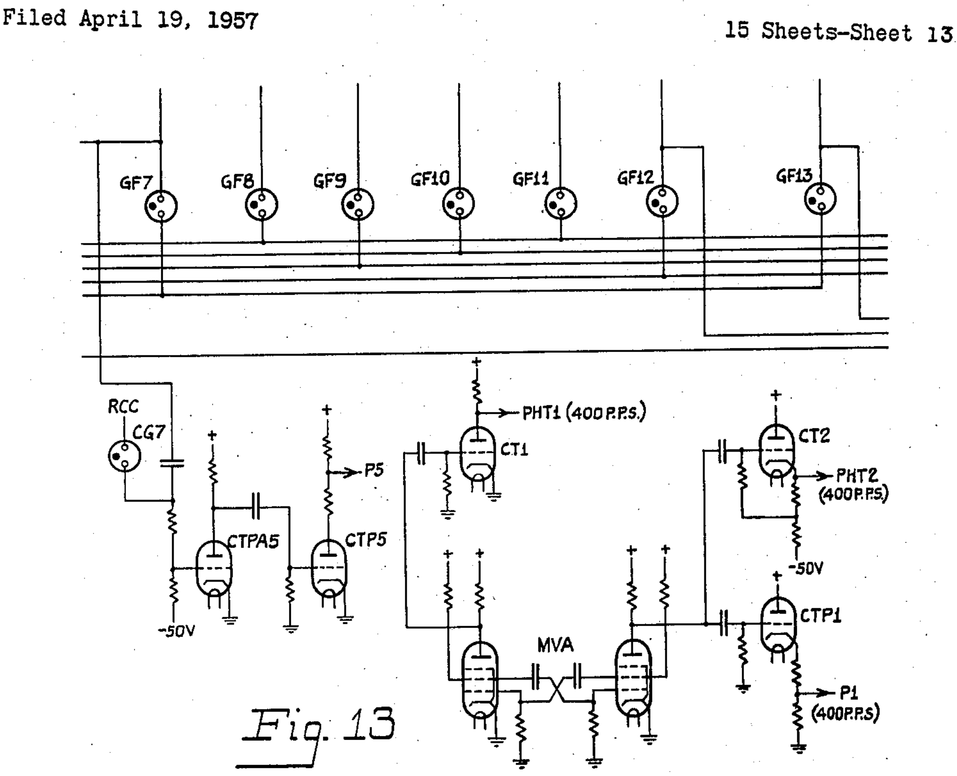

*Line scanning and pulse distribution arrangements—(common control equipment).*—The central control of the line scanning and pulse distribution arrangements, and indeed of the whole exchange, comprises the 400 c.p.s. symmetrical multivibrator MVA (Fig. 13). The tube CT1, which produces 400 p.p.s. pulsed high tension at lead PHT1 for use in all the various circuits of the exchange, is rendered non-conducting to give a high voltage output from its anode, each time the left-hand tube of the multivibrator conducts. Tubes CT2 and CTP1, with cathode follower outputs, are controlled from the anode of the right-hand tube of the multivibrator and are cut-off each time the latter tube conducts. During each period of conduction tube CT2 supplies a pulse of H.T. over lead PHT2 to a corresponding lead in the line circuit, whereas tube CTP1, during the same periods, supplies a sharp positive pulse over lead P1 to various points in the common control equipment, the link circuits and the registers.

*Line scanning.*—The line scanning equipment, which is continuously operating, essentially comprises a twelve-stage fast scanner FS and a ten stage slow scanner SS. Each scanner is a pulse-counting ring, the fast scanner being arranged to operate stage-by-stage at 400 per sec. and to provide a driving pulse, one per cycle of operations, to advance the slow scanner one stage.

The fast scanner has a count tube such as F1 to F12 and a pulse repeater tube such as RF1 to RF12 in each stage. The count tubes are arranged for mutual extinction and the one which happens to be in a fired condition, serves to prime the pulse repeater of the next stage in the ring. It is to be noted that the cathode of tube F12 is connected to the trigger electrode of tube RF1 to complete the twelve-stage ring. All the pulse repeater tubes have their anodes connected to pulsed H.T. supply PHT1, and their trigger electrodes are supplied with positive pulses from the cathode of tube RFS (Fig. 8) which fires 400 times per sec. under control of the supplies PHT1 and P1 at anode and trigger electrode respectively. Thus any primed pulse repeater tube is fired for the duration of the H.T. pulse on the next occurring pulse from tube RFS, and this fires the relevant count tube which extinguishes its predecessor, and primes the next pulse repeater tube in readiness for it to be fired by the succeeding P1 pulse.

Outputs Y1 and Y10 are derived from the cathodes of tubes RF2 to RF11, and each of these is connected to the Y lead of ten subscriber's line circuits having the corresponding units digit designation. Thus for example, upon the firing of tube RF2, a positive pulse, applied to lead Y1, is connected to line circuits numbered "11," "21" . . . "01."

Tube RF1 of the fast scanner, has two tubes FSS and ARF1 connected in parallel with it, and the first of them is fired due to the application of a start pulse to lead SP a short time after supply has initially been connected to the exchange. The momentary firing of this tube, which like tubes ARF1 and RF1 to RF18, has its anode connected to the pulsed H.T. supply PHT1, fires tube F1 to institute stage-by-stage operation of the fast scanner. Tube FSS is extinguished when the H.T. pulse is removed and thereafter remains inoperative.

The slow scanner comprises essentially ten mutually extinguishing count tubes S1 to S10 and ten self-extinguishing pulse repeater tubes RS1 to RS10 of which tubes S3 to S9 and RS3 to RS9 have been omitted from the drawing. The first count tube S1 has the usual auxiliary tube SSS in parallel with it to intiate operation of the slow scanner when it is fired by the common start pulse SP upon the exchange being initially introduced into service. Under these circumstances, the raised potential at the cathode of tube SSS serves to prime the repeater tube RS1 in readiness for firing when a pulse is received from tube RSS upon the latter tube (which has its anode supplied from source PHT1), being fired in the first place due to the firing of tube FSS.

In the slow scanner each pulse repeater tube RS1 to RS10 has its cathode circuit coupled to the trigger electrode of the succeeding count tube, viz. RS10 to S1, RS1 to S2 . . . RS9 to S10. Moreover a count tube which happens to be conducting, primes the appropriate pulse repeater tube, thus tube S1 primes tube RS1 and so on. The trigger electrodes of the pulse repeater tubes are connected over separate capacitors to the cathode of the driving tube RSS which in the normal course of events is fired once for each complete cycle of operations of the fast scanner, i.e. tube RSS fires each time tube RF1 in the fast scanner becomes conducting. Upon the firing of tube RSS a positive pulse is connected to the trigger electrodes of tubes RS1 to RS10 so that the already primed tube is fired. The firing of a pulse repeater tube causes the next count tube in the sequence to fire and this extinguishes its predecessor whilst also priming the next pulse repeated. Thus it will be appreciated that the slow scanner is advanced by the count of "1" for each cycle of operations of the fast scanner.

Now the cathodes of count tubes S1 to S10 of the slow scanner extend to leads X1 to X10, and as was outlined in the description of the subscriber's line circuit, each of these leads is connected to the X leads of ten line circuits having a tens digit appropriate to the numerical portion of the lead reference. Thus for example when tube S1 is fired, and this will persist for one scanning cycle of the fast scanner FS, a positive bias potential is applied to the X leads of line circuits numbered "11," "12" . . . "10."

It can now be seen that in the normal course of events the fast scanner advances from stage to stage at 2.5 ms. intervals under control of tube RFS to complete a cycle in 30 ms., whereas the slow scanner in advancing one stage for every cycle of the fast scanner completes its cycle in 300 ms. In the latter period the scanning equipment covers the 100 subscribers' line circuits of the exchange. Moreover the co-ordinate disposition of the line circuits with respect to the scanning arrangements enables each line circuit in its proper time to be marked with a bias (tens digit) and a pulse (units digit) potential.

*Extension to fast scanner.*—Count tubes F13 to F18 and the allied pulse repeater tubes RF13 to RF18, collectively designated EFS, constitute an extension to the fast scanner FS but are inoperative until a register is required to mark the line circuit of a called subscriber. The function of the extension circuit is to cntrol the generation of pulsed H.T. supplies PHT4 and PHT5 which are required for call terminations, the H.T. pulses being produced in distinct periods following a cycle of the fast scanner, when a demand is received from either register. The normal twelve-stage fast scan, is operative as described only while the driving tube of RFS is enabled to fire 400 times per sec. since it is primed by the normally conducting tube FSC, which together with tube EFSC forms a mutually extinguishing pair.

When either register has completed the storage of the two digits appropriate to a called subscriber, a condition is produced therein to fire tube RG7 (Fig. 9) which is connected to the trigger electrode of the self-extinguishing pulse repeater tube SPR in the common control equipment. Tube RG7 primes tube SPR so that when the last pulse repeater tube RF12 of the normal twelve-position fast scan is fired in its proper time, tube SPR is fired in addition to count tube F12, the latter effectively priming tube RF13. Upon tube SPR firing, a positive firing pulse is delivered to the trigger electrodes of tubes EFSC and SAP, the latter like tube SAPA being arranged in mutual extinguishing relationship with tubes S1 to S10 of the slow scanner. However when tube EFSC conducts, it extinguishes tube FSC and primes the repeater tube REFS. With the extinguishing of tube FSC, tube RFS is prevented from repeating pulses from the 400 p.p.s. supply to the trigger electrodes of tube ARF1 and tubes RF1 to RF12. Since tube EFSC is now fired, tube REFS, activated from sources PHT1 and P1, delivers pulses to the triggers of tubes RF13 to RF18 in the six-stage extension EFS to the normal fast scanner.

The stages of the extension circuit comprising tubes RF13 and F13 to RF18 and F18 are similar to those of the twelve-stage fast scanner, the pulse repeater and count tubes being arranged in mutually extinguishing manner with respect to the corresponding tubes of the latter but they respond stage-by-stage, from left to right, to the 400 p.p.s. input from tube REFS. During the operation of the extension circuit, the firing of tubes RF13 and RF15 in their due times, defines the beginning and end respectively of a PHT4 pulse, whereas the firing of tubes RF16 and RF18 defines the beginning and end of a PHT5 pulse.

Tube RF18 duly fires to cause conduction of tubes F18 and FSC, whereupon tube F18 primes tube ARF1, which is in parallel with tube RF1, whereas tube FSC primes tube RFS and extinguishes tube EFSC, the latter disabling tube REFS. Tube RFS proceeds to fire at the rate of 400 times per sec., and the first pulse derived from it fires tube ARF1 which remains conducting until tube RF2 subsequently fires. Tube ARF1 fires tube F1 which primes tube RF2 for firing by the next pulse from tube RFS.

The cyclic operation of the 12-stage fast scanner again proceeds as already described, and the extension circuit EFS remains inoperative until another demand is received from a register.

Tubes ARS10 and SAP are associated with the slow scanner SS to prevent mis-operation of a subscriber's line circuit, which would take place if the slow scanner were allowed to bias lead X (tens digit) of a subscriber's line circuit when the leads TX (tens digits) and TY (units digit) of the same line circuit were being marked by a register. In this event, referring to the line circuit (Fig. 1), tubes TT and OT would both be primed, and, upon the firing of tube XYT, the triggering pulse applied to both tubes would ensure that the already conducting tube of the pair remains so. If this happened to be tube AT the proper operation of the line circuit would not take place. The difficulty is overcome by firing the auxiliary count tube SAP of the slow scanner when tube SPR fires due to the register being ready to effect marking. Tube SAP thereupon extinguishes that one of count tube S1 to S10 which happens to be fired, and accordingly the line scanning bias (X) obtained from it is removed. Tube SAP when fired, primes tube ARS10, which is in parallel with tube RS10. The next driving pulse extended to the slow scanner, when tube ARF1 is fired by tube F18, causes tube ARS10 to be struck and this renders tube S1 conducting. Thereupon tube SAP is extinguished and normal operation of the scanner ensues.

*Preventing two calling subscribers being connected to the same link circuit.*—The possibility would only arise when two subscribers having the same tens digit, initiates calls within the period of the same complete scanning cycle and at instants which would permit them both to be scanned, i.e. biased and pulsed, during the same cycle of operations of the fast scanner. It will be recalled, as was described with reference to the link circuit allotter, that tube PFH (allotted link circuit) upon firing (and through the intermediary of tube LV3) determines that the 100 pairs of P and H tubes relevant to the link circuit are primed. Now tube PPH is, in the normal course of event, only extinguished for a short interval, when the pulsed H.T. supply PHT3 is interrupted, at the end of each fast scanning cycle. Therefore two subscribers initiating calls in the beforementioned circumstances would cause their relevant sets (ten each) of P and H tubes to receive trigger pulses, and in consequence one set of tubes for each line circuit would be fired. The relevant speech tubes SP would also be fired, to complete the connection of both calling subscribers to the link circuit.

To obviate the foregoing possibility, tubes SAPA and BRS10 (Fig. 7) are associated with the slow scanner, the former, which is controlled from a "Z" pulse, is connected in mutually extinguishing relationship with the count tubes, and the latter is connected in parallel with pulse repeater tube RS10. When the first of the two calling line circuits is scanned the relevant P and H tubes are pulsed to establish connections to the link circuit, and the "Z" pulse which is generated fires tube SAPA. This extinguishes the fired count tube to remove the X lead bias potential from the particular ten subscribers' line circuits, and moreover primes tube BRS10. It follows that when the fast scanner applies a pulse to the second line circuit the absence of the bias potential makes it ineffectual and therefore the relevant P and H tubes are not pulsed. The next occurring driving pulse from the fast scanner fires tube BRS10 which strikes tube S1 and normal operation of the slow scanner proceeds from this point. The second calling line circuit would be duly connected to another allotted link circuit when the coordinate scanning condition is next applied to it.

*Pulse and pulsed H.T. generation.*—The fast and slow scanners are used in the production of pulse and pulsed H.T. supplies and the operation of the circuits in this respect will now be described. The relationship of certain of the supplies is shown in Fig. 16.

*Pulses ONP (originating negative pulses).*—These pulses, which are utilised in calling line circuits are derived over lead ONP from the circuit element comprising thermionic tubes CTOA, CTP7 and CTO, and recur at 15 ms. intervals. Normally tubes CTOA and CTO are cut-off and tube CTP7 is conducting, but when a positive pulse is applied to the grid of tube CTOA the three tubes change their states momentarily, whereupon a negative-going pulse is produced at lead ONP. Now the grid of tube CTOA, besides having a 50 volts negative bias, is connected to diodes GF4, GF10 and GF16 which are arranged to be fired respectively when pulse repeater tubes RF4, RF10 and RF16 of the fast scanner and its extension circuit are struck. The firing of each of these tubes provides the necessary pulse at the grid of tube CTOA, and since the fast scanner alone or together with its six-stage extension is driven at 400 stages per sec., it will be seen that under either condition negative-going pulses are produced at lead ONP every 5 ms.

*Pulses P7.*—The normally conducting tube CTP7 which, together with tubes CTOA and CTO, is concerned with the generation of pulses ONP, also supplies positive pulses to lead P7 from its anode circuit, a positive pulse being produced every 15 ms. The pulses are operative on the "F" pulse generating element FG in the link circuit.

*Pulses TNP (terminating negative pulses).*—These pulses are utilised in called subscribers' line circuits and are obtained from the circuit element comprising thermionic tubes CTTA, CTTB and CTT of which tube CTTB alone is normally conducting. Tube CTTA only conducts upon the momentary coincidence of a bias and pulse at its grid, the bias being due to conduction of either of diodes GS1, GS3, GS5, GS7 and GS9 (associated with the slow scanner) and the pulse being delivered over a capacitor when tube RF7 fires in the fast scanner. The conduction of tube CTTA causes a negative-going pulse to be produced at lead TNP. Diodes GS1, GS3, GS5, GS7 and GS9 are arranged to be fired for 30 ms. periods at intervals of usually 60 ms., upon conduction of count tubes S1, S3, S5, S7 and S9 of the slow scanner respectively. Tube RF7 fires some 15 ms. after the initial firing of each diode, at a point intermediate tubes RF4 and RF10 which govern the generation of the 15 ms. interval pulses ONP. Hence the sharp negative-going pulses TNP are generally produced at 60 ms. intervals although intervals of 75 ms., and even 90 ms., will occur intermittently according to the control exercised upon the scanning equipment by registers requiring to mark called line circuits. In any event the pulses occur intermediate successive ONP pulses.

*Pulsed H.T.—PHT3.*—This is used in the link circuits where it is concerned with the priming of P and H (multiple) tubes of an alloted link circuit and with the seizing of said circuit, the H.T. being present throughout the periods that the line circuits are being subjected to the fast scan. The output is derived from the anode of thermionic tube CT3. Tubes PC1 to PC6 are arranged in mutually extinguishing manner and tube PC1 is fired each time tube RF1 in the fast scanner conducts. Tube PC1 thereupon fires diode CG4 to render tube CTA3 conducting, whereupon tube CT3 is cut-off and the H.T. output is produced at lead PHT3. Some 27.5 ms. after the firing of tube RF1, i.e. after completion of the fast scan, tube RF12 fires and the same firing pulse is applied to tube PC2 which conducts and extinguishes tube PC1 and so changes the conditions of tubes CG4, CTA3 and CT3, the conduction of the latter lowering the output potential. This persists until tube RF1 again fires when the whole process is started again. It will be appreciated that under the normal recurrent 12-stage operation of the fast scanner, the interruption of H.T. is for 2.5 ms., whereas when thes canner is extended this period is increased to 17.5 ms.

*Pulsed H.T.—PHT4 and PHT5.*—H.T. potentials are obtained at leads PHT4 and PHT5, from the anodes of thermionic tubes CT4 and CT5 respectively during successive periods during the run-through of the extension EFS to the fast scanner and this occurs only when a register is ready to mark a called line. The pulsed H.T. supply leads, PHT4 and PHT5, are connected to registers REG1 and REG2 respectively and also to all link circuits and are used for the initiation of the priming of multiple tubes P and H in the establishing of a connection between the link circuit associated with the register which is marking and the called line circuit. When tube RF13 of the extension circuit EFS is fired, tube PC3 is struck. This extinguishes tube PC2 and causes tube CG5 to conduct, the latter raising the grid potential of tube CTA4 above cut-off. Tube CTA4 thereupon cuts off tube CT4 and the potential at the output lead PHT4 is raised to H.T. This persists until tube RF15 is fired, 5.0 ms. after tube RF13, whereupon tube PC4 fires to cause tubes PC3, CG5, CTA4 and CT4 to revert to their previous conditions.

Tubes PC5, CG6, CTA5, CT5 and PC6 function in the same manner as those just described except that tubes PC5 and PC6 are fired by tubes RF16 and RF18 respectively. Output lead PHT5 will be at H.T. for a period of 5.0 ms. starting 2.5 ms. after the lowering of the potential at lead PHT4.

*Pulsed H.T.—PHT6 and PHT7.*—These supplies extend to the link circuits for use in conjunction with gates, (tubes OPG and TPG) in the link circuits, concerned with the detection of pulses ONP and TNP which are extended to link circuits from calling and called subscribers line circuits respectively. Both pulsed H.T. sources comprise 5 ms. pulses with 10 ms. intervals the pulses from each source being so displaced as to be central with respect to the intervals of the other source. Moreover the H.T. periods of PHT6 are so related to pulses ONP that the latter occur centrally with respect to the former, and it follows that the PHT7 H.T. periods will similarly coincide with certain of the TNP pulses. The fast scanner (and its extension when operative) are concerned in the generation of pulsed H.T., PHT6 and PHT7, which are obtained from the anodes of thermionic tubes CT6 and CT7 respectively. Tubes PC7, PC8 and PC9 are mutually extinguishing and tube PC7 is fired when either of tubes RF2, RF5, RF8, RF11, RF14 or RF17 is fired, the diodes GF2, GF5, GF8, GF11, GF14 and GF17 being struck by the corresponding pulse repeater tubes. Tube PC8 is fired upon the striking of diodes GF3, GF9 and GF15 on tubes RF3, RF9 and RF15 respectively, and similarly tube PC9 is fired on the striking of diodes GF6, GF12 and GF18 by tubes RF6, RF12 and RF18.

For the purpose of demonstrating the cyclic generation of the PHT6 and PHT7 supplies, it will be assumed that tube PC7 has been fired due to conduction of tube GF2, and thereupon, a 5 ms. period of H.T. at lead PHT7 is terminated. Then 2.5 ms. later tube GF3 fires to strike tube PC8 which extinguishes tube PC7 and fires tube CG8. The latter renders thermionic tube CTA6 conducting, whereupon tube CT6 is cut-off so that the potential at lead PHT6 becomes H.T. After a period of 5.0 ms., conduction of tube GF5 fires tube PC7 which extinguishes tube PC8 to terminate the period of the PHT6 pulse. Tube GF6, in firing 2.5 ms. after GF5, strikes tube PC9, and this extinguishes tube PC7 and moreover through the intermediary of diode CG9, and thermionic tubes CTA7 and CT7, produces H.T. at lead PHT7. This H.T. persists until tube PC7 is again rendered conducting by the firing of tube GF8, 5.0 ms. later, whereupon tube PC9 is extinguished. The firing of tube GF9 initiates another high voltage condition at lead PHT6 (after the prescribed interruption of 10 ms.), and it will be understood that the whole process is repetitive as the fast scanner, with or without its extension circuit, is cyclically operated.

*Pulses P2.*—Diodes GF1, GF7 and GF13, which are fired at 15 ms. intervals by tubes RF1, RF7 and RF13 respectively of the fast scanner, are concerned with the generation of positive pulses at lead P2, through the intermediary of thermionic tubes CTP2 and CTPA2. The firing of any one of the diodes renders tube CTPA2 conducting, whereupon tube CTP2 is cut-off momentarily to produce a sharp positive pulse at the output lead. The positive pulses are intermediate to the originating negative pulses ONP previously mentioned, and are operative in the digit responding element, i.e. the "A" and "C" pulse producing element ACG, of each register, and also in the "B" pulse producing element of the link circuits.

*Pulses P5.*—These positive pulses are used in conjunction with PHT7 in the link circuits for firing tube RGC in line circuits to control the application of ringing current to subscribers' lines. The pulses are generated at 30 ms. intervals (sometimes 45 ms.) during those periods corresponding to "On" periods of each ringing cycle i.e. when H.T. is connected, over leads RHT, to the anode of line circuit tubes RGC. Pulses P5 are obtained from the anode of thermonic tube CTP5 due to the momentary cutting-off of the tube when tube CTPA5 conducts due to the coincidence of a bias potential, consequent upon the firing of diode CG7, and a pulse at its grid. The latter pulse is obtained each time tube RF fires in the fast scanner. The firing of tube CG7 to produce the bias is effected over lead RCC by a ringing cycle control circuit (part of the common control equipment but not shown), the potential at said lead being raised for periods corresponding to the periods when H.T. is present upon leads RHT of the line circuits.

*Link circuit and register.*—These are best described together with reference to the progress of a call. It will be recalled with reference to the description of the link circuit allotter and subscriber's line circuit, that upon the initiation of a call by a subscriber the particular line circuit is connected to the allotted link circuit over the appropriate set of SP, H and P tubes in the multiple. At this juncture, originating negative pulses ONP, occurring at 15 ms. intervals, are effectively extended over the calling subscriber's line circuit and the P tube to the grid of thermionic tube LV4, and this tube, upon the occurrence of each pulse, produces a positive pulse at its anode. The positive pulses are applied to the trigger of tube LPR19 which has its anode supplied from the 400 p.p.s. pulsed H.T. source PHT1.

During the process of connecting the calling line circuit to the link circuit, it will be re-called that tubes PPH (Fig. 5), LV3 (Fig. 2) and LPR4 (Fig. 3) were conducting until termination of the PHT3 pulse, i.e. until after completion of the fast scanning cycle concerned in the detection of the initial subscriber-calling condition. The conduction of tube LPR4 at that time advanced the link circuit sequence control counter to the stage indicative of the seized state, in that it fired tube SZ which initiated allotting of the next idle link circuit. Tube SZ also energised a 5 sec. delay circuit in the path to the trigger of tube LPR9, the latter tube however remaining inoperative if a register is taken into use by the link circuit within the prescribed delay period.

*Seizing the allotted register.*—Now the pair of tubes C1 and D1 and the pair of tubes C2 and D2 which are alternatively to provide connections from the seized link circuit to registers REG1 and REG2 respectively, have similar connections in the relevant registers. It will be assumed that register REG1 has been pre-allotted for use, but it will be appreciated that the circuit operation would be along the same lines if register REG2 had been allotted.

Figure 3:
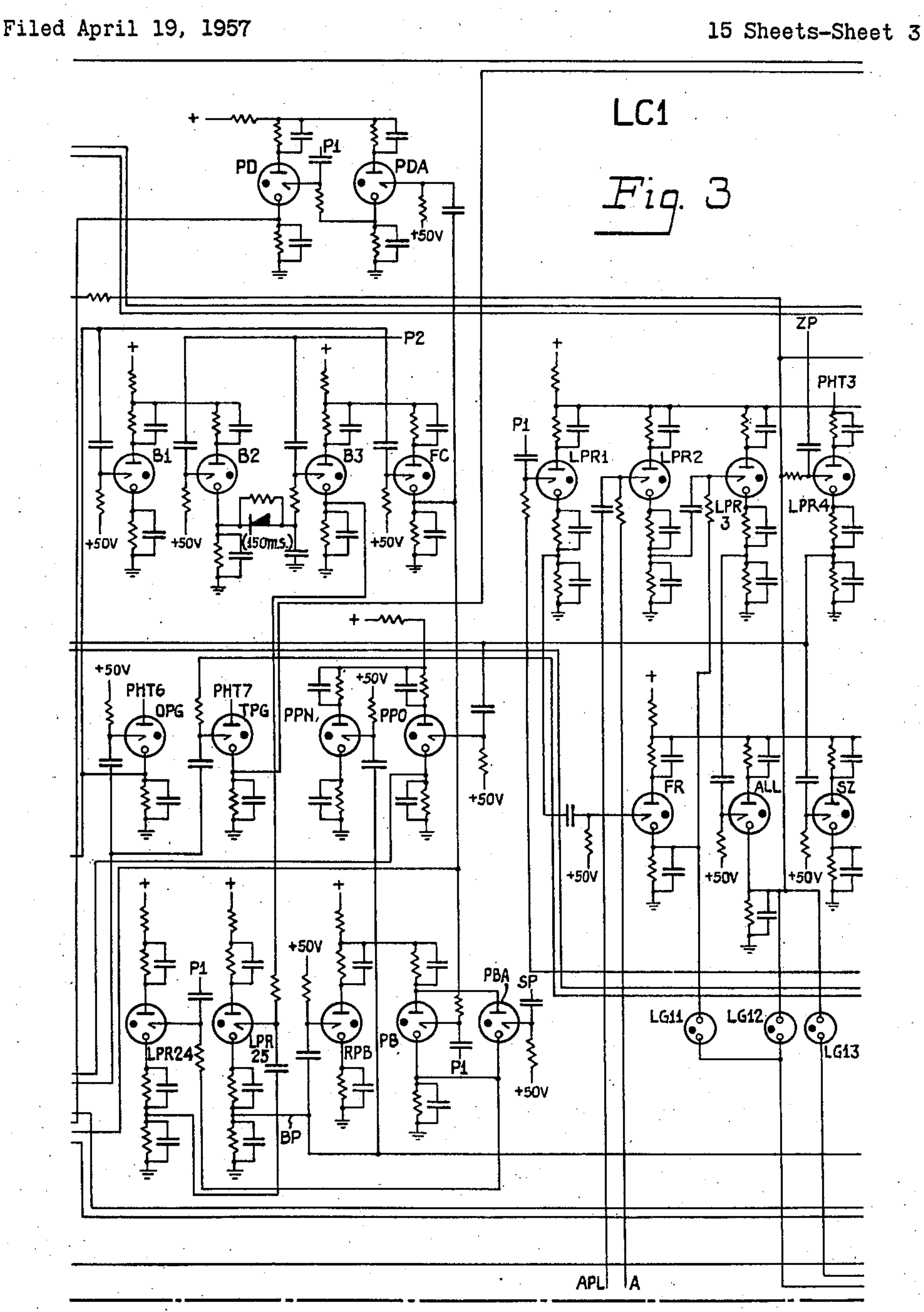
Figure 4:
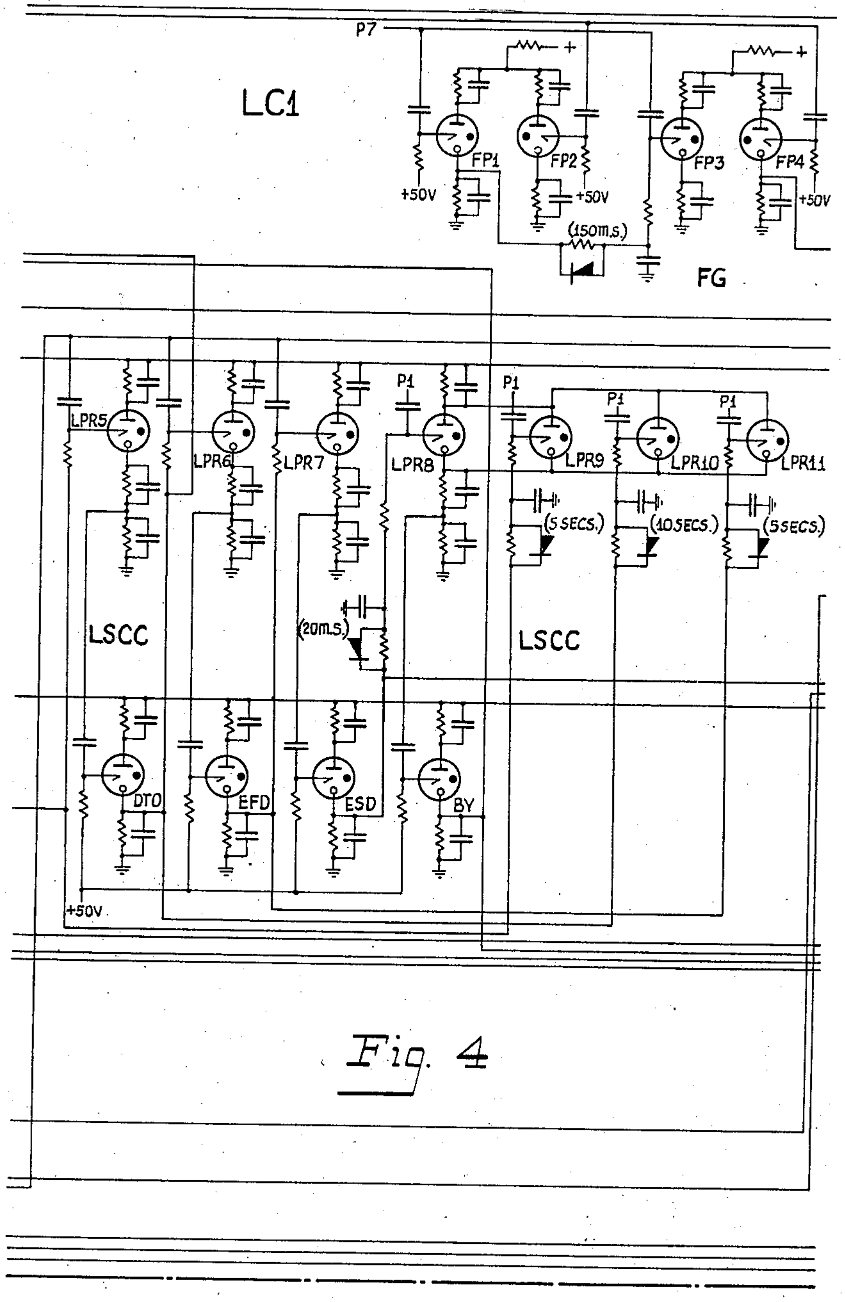
Figure 5:
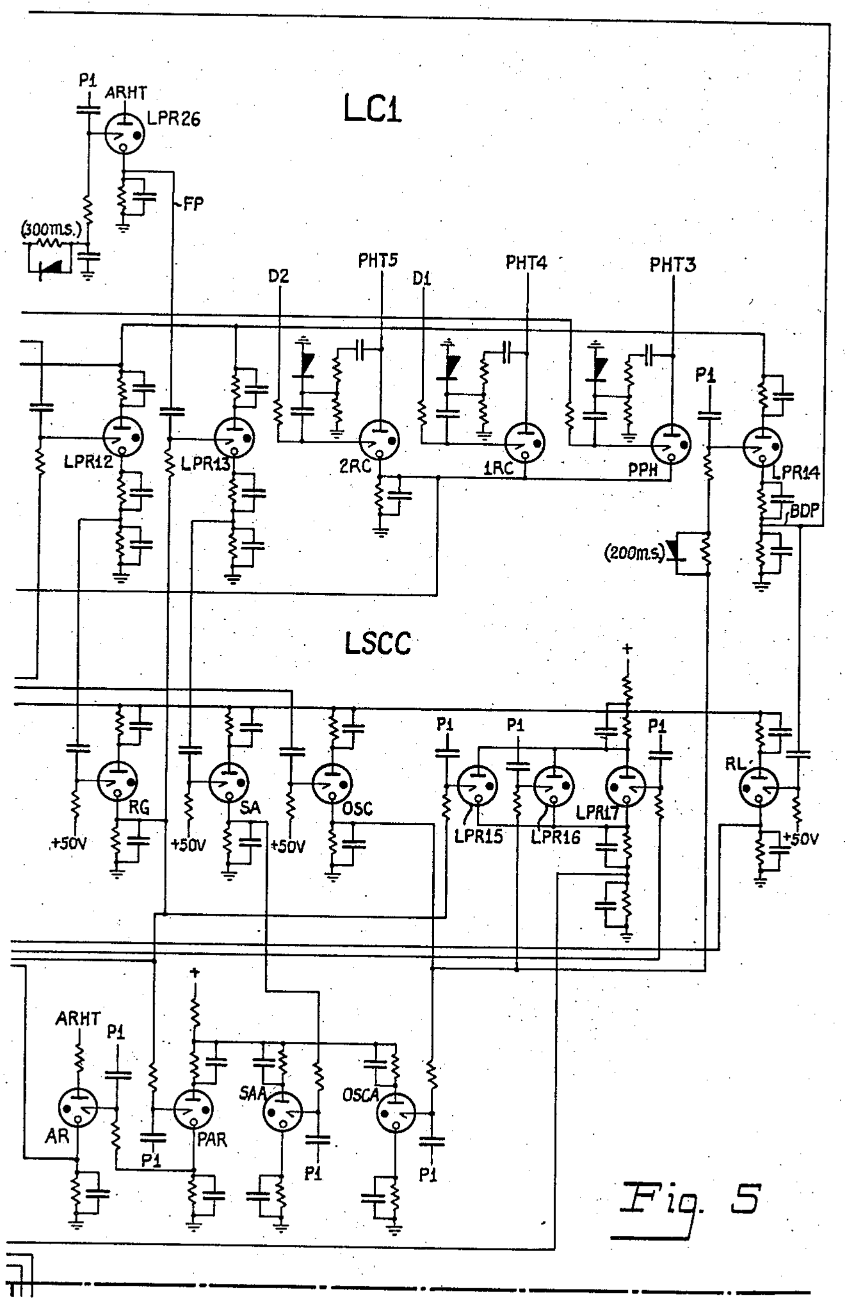
Figure 6:
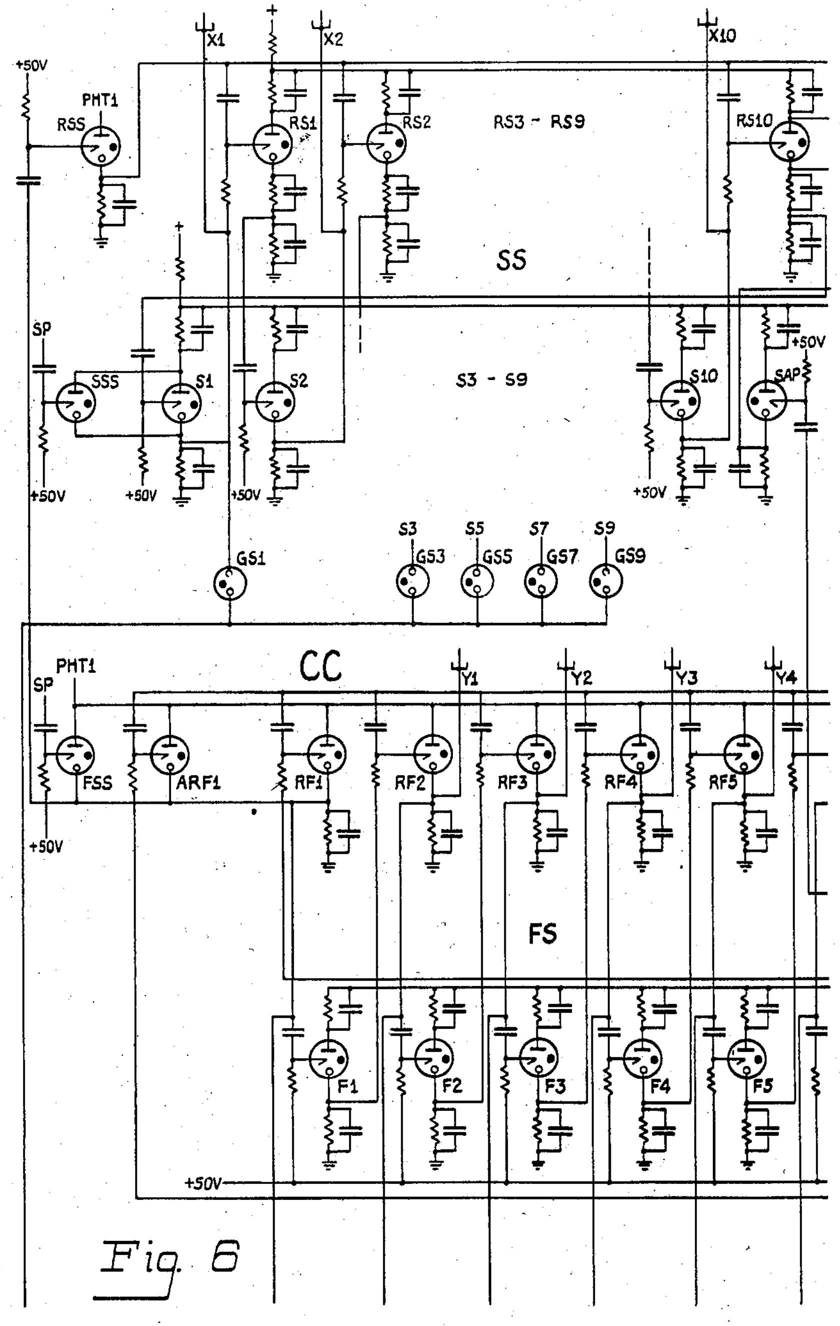
Figure 7:
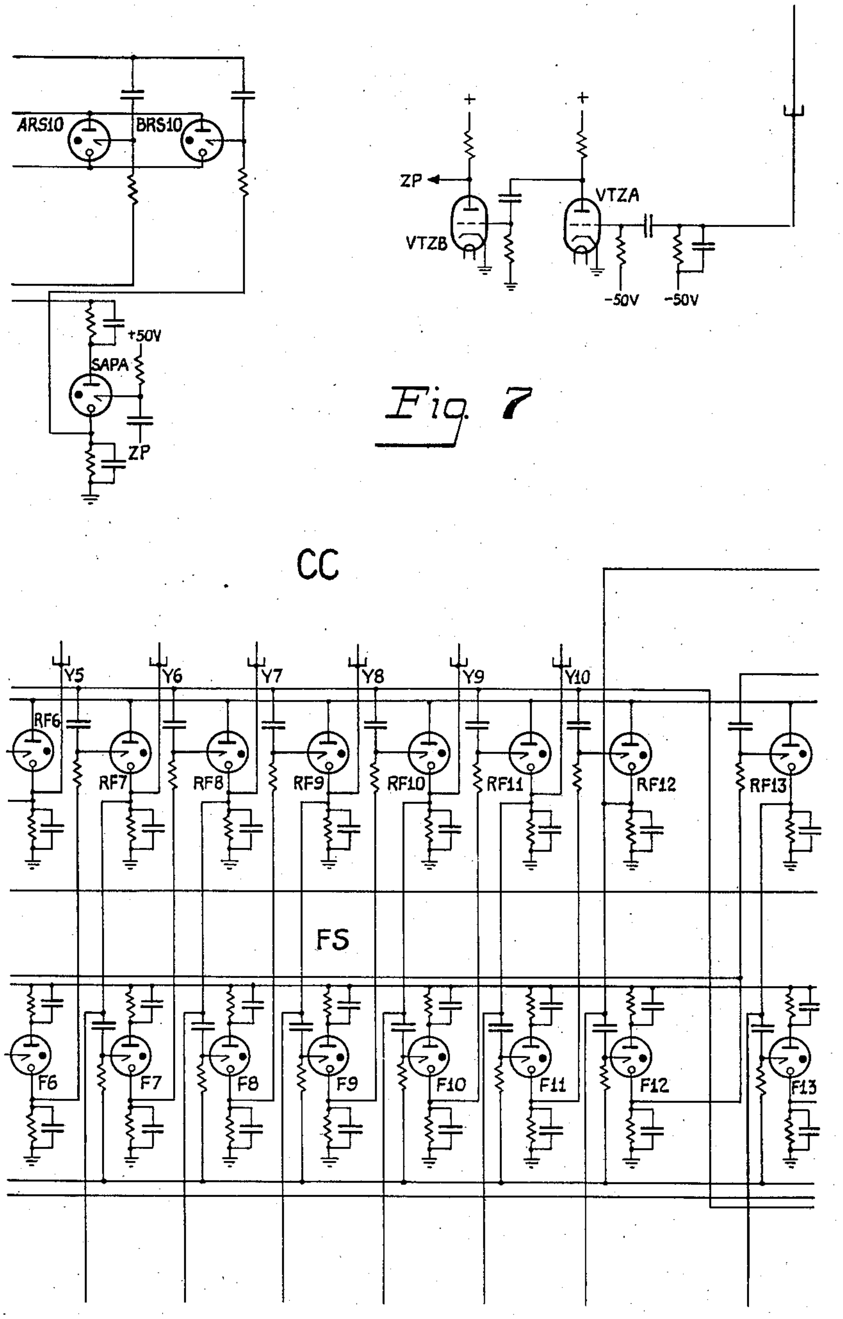
Figure 8:
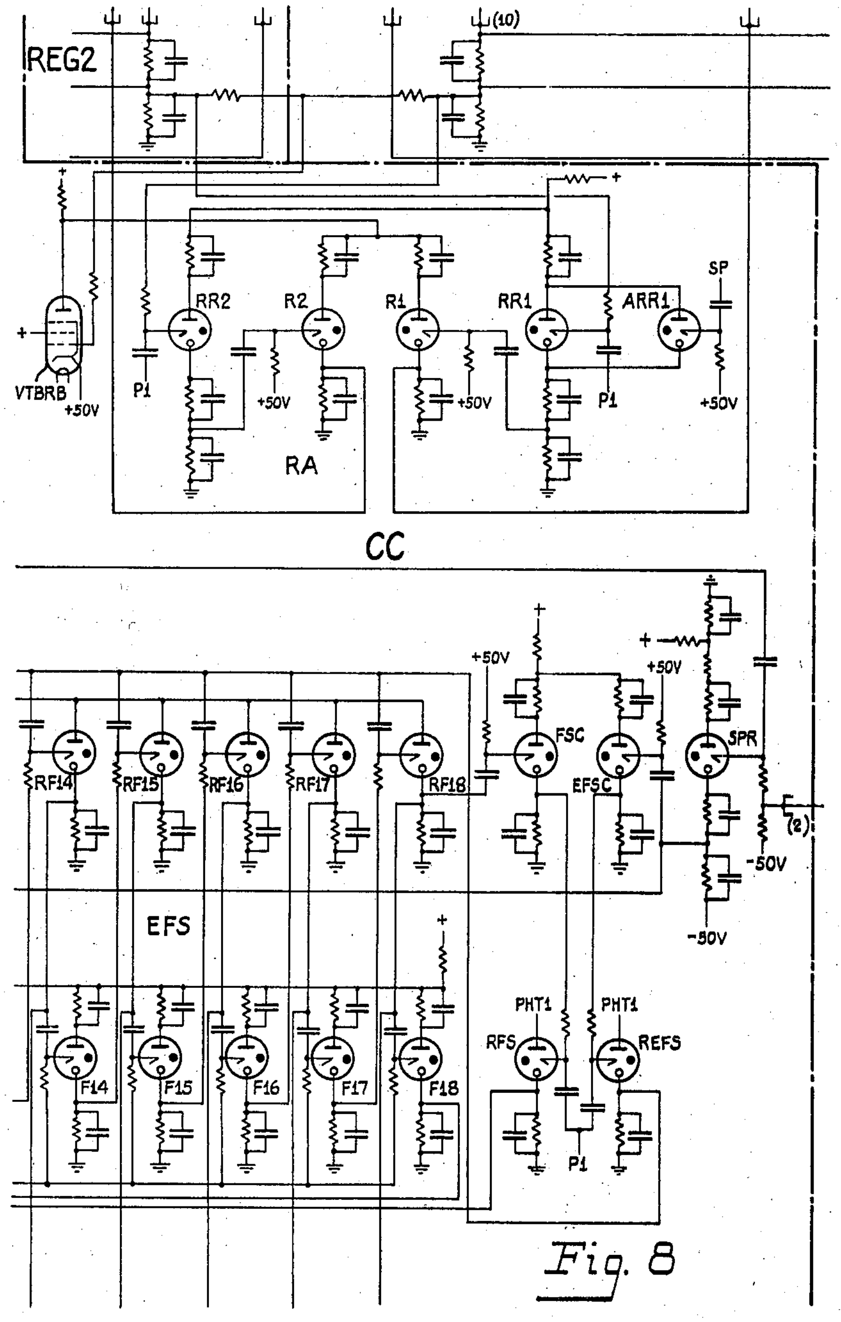
Figure 9:
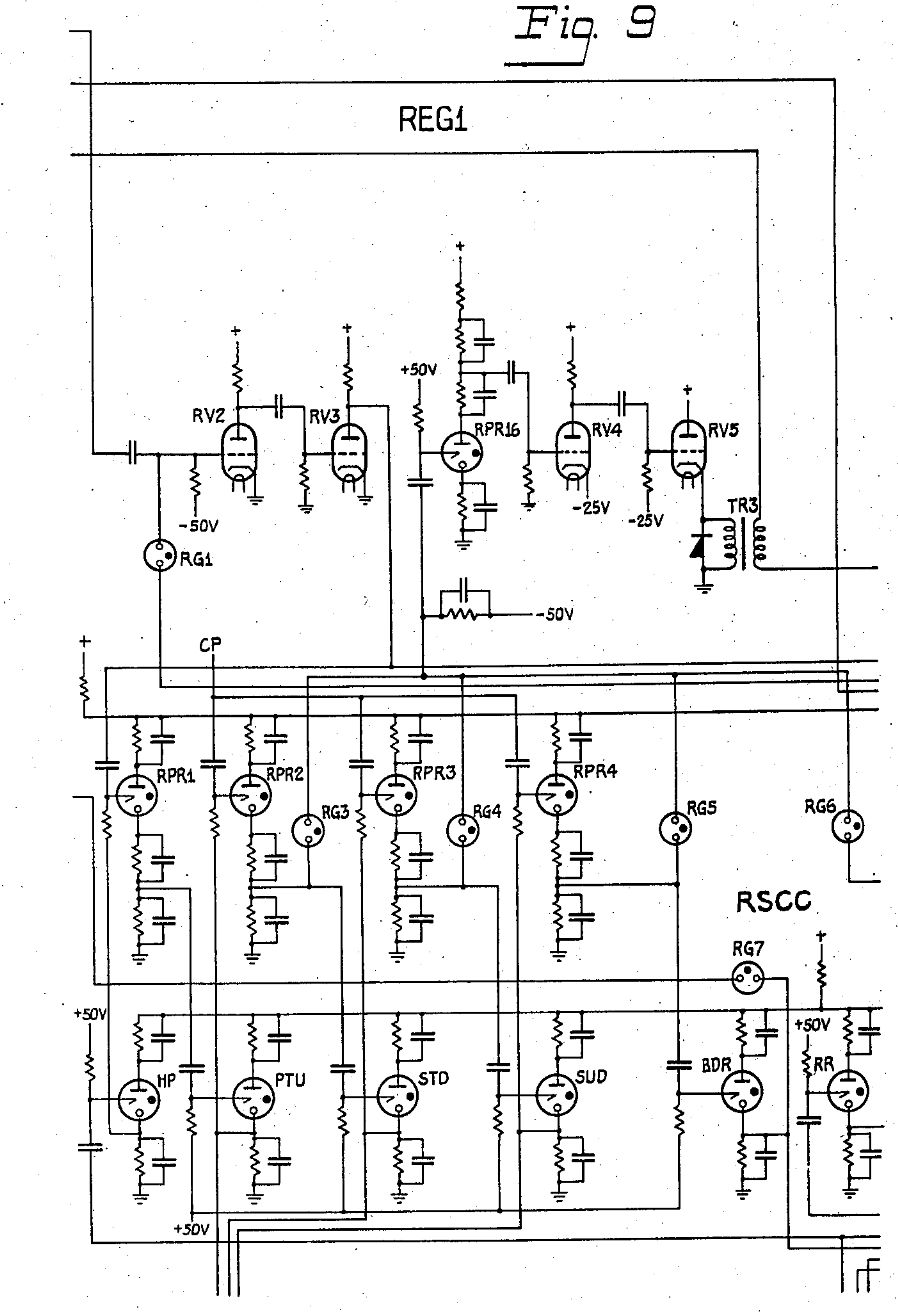
Figure 10:
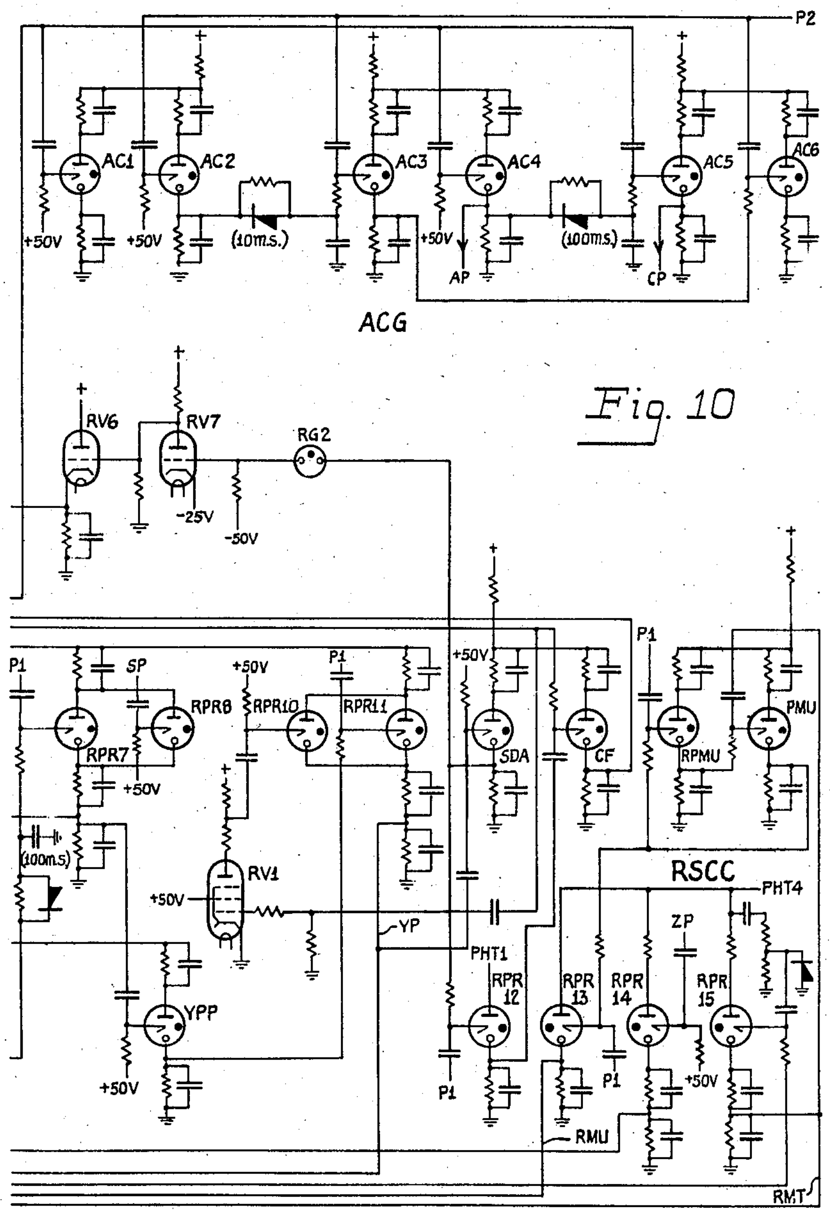
Figure 11:
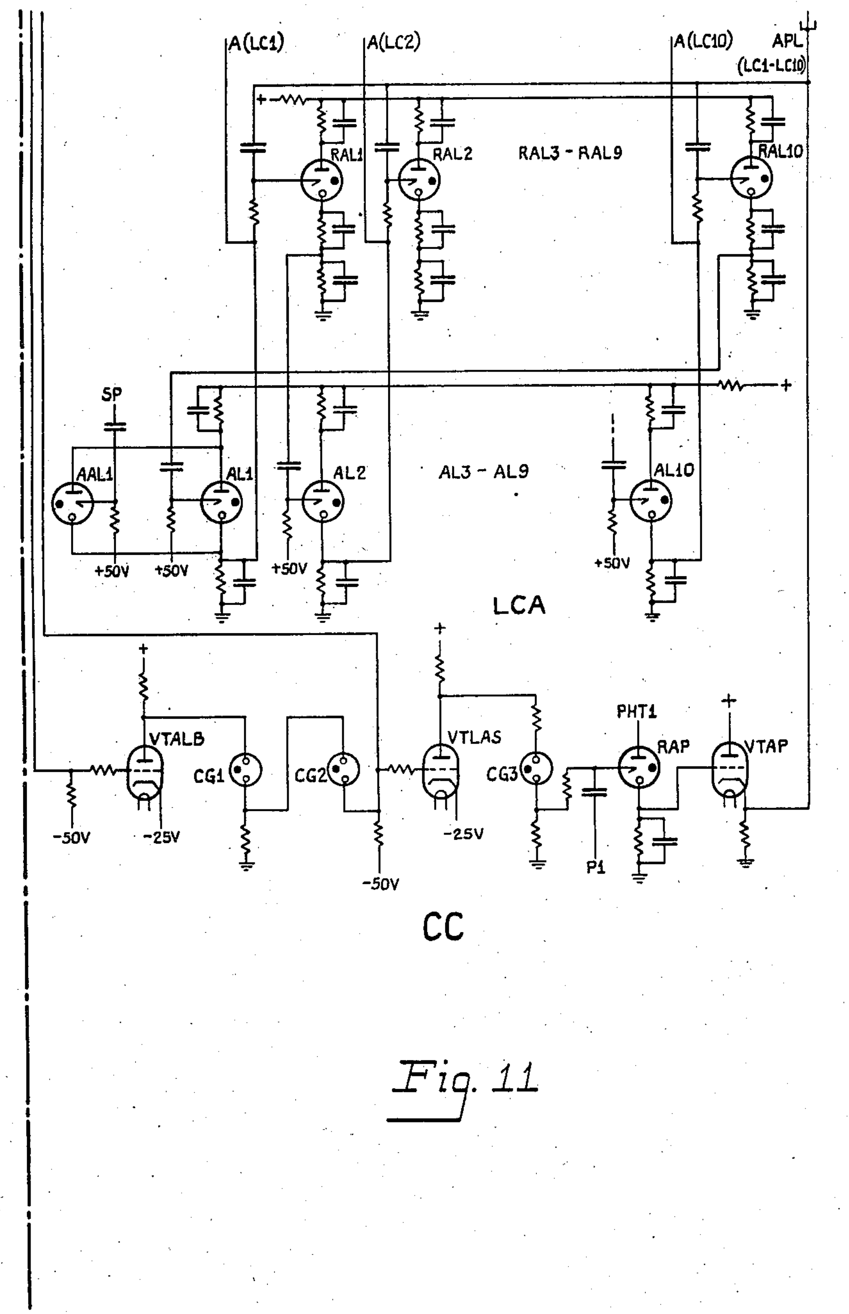
Figure 12:
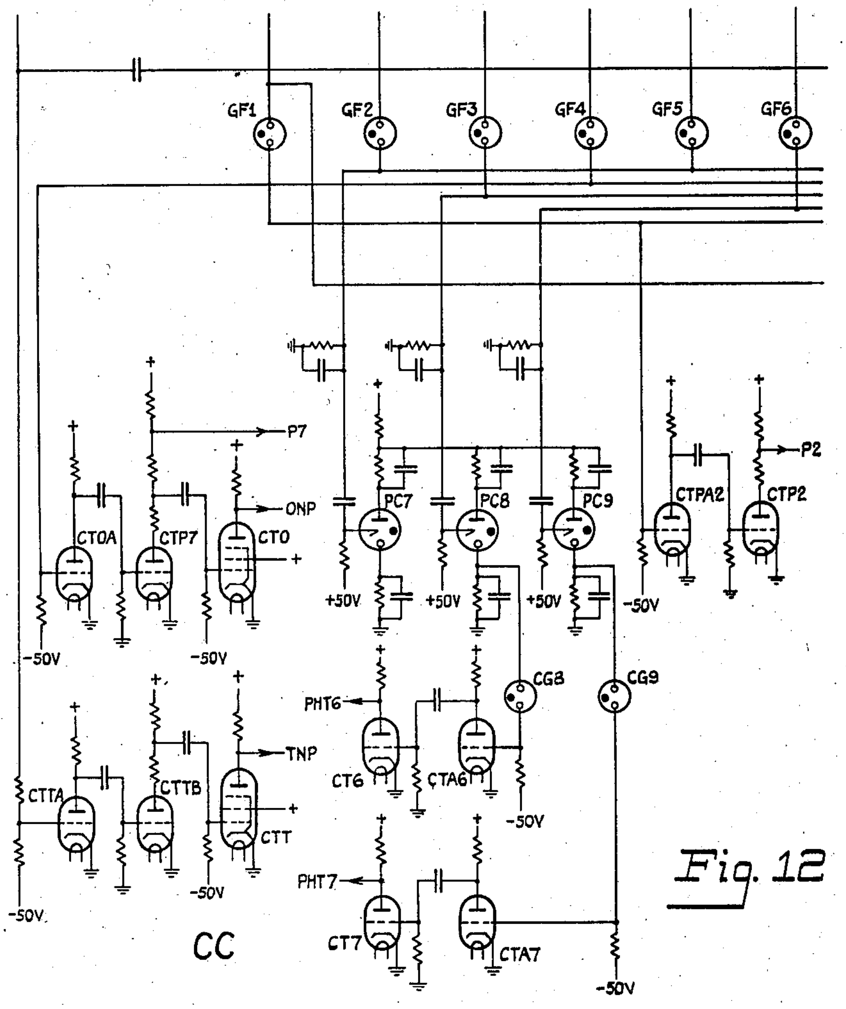

Upon tube LPR4 in the link circuit being fired, with the results mentioned above, the positive potential obtaining at its cathode also produces a firing pulse at the triggers of tubes CA (Fig. 2) and PPO (Fig. 3). Thereupon, tube CA extinguishes tube CAB, and tube PPO extinguishes tube PPN. Tube CAB extinguishes the diode LG4, and this cuts-off thermionic tube LV1 which enables tube LV2 to conduct. Thereupon the latter provides H.T. for the anodes of tubes C1 and C2. With tube PPO conducting, tube LPR19 (which has its anode fed from the 400 p.p.s. pulsed H.T. supply PHT1) is primed, and accordingly the latter is fired due to ONP pulses delivered to the link circuit by the line circuit. Each time tube LPR19 is fired, a positive pulse is applied to the triggers of tubes OPG and TPG which are the originating (ONP) and terminating (TNP) pulse gates respectively. Tube OPG derives pulsed H.T. at its anode from source PHT6 and, since the H.T. pulses coincide with the pulses (originating) from tube LPR19, tube OPG is fired repeatedly for so long as the calling subscriber is employing the link circuit, although the length of the periods when it is not fired will be increased when dialling eventually takes place.

Meantime tube OPG delivers positive pulses, at 15 ms. intervals to the anodes of the register-connecting tubes C1 and C2, and to the triggers of tubes B1 and FC. The first pulse serves to fire tubes B1 and FC so that the partner tubes B2 and B3 respectively are extinguished whereupon tube B2 resets the 150 ms. delay circuit which previously provided the primary potential for tube B3. Tubes B2 and B3, which receive trigger pulses from source P2 (15 ms. intervals), and are eventually concerned with the generation of so-called "B" pulse when the calling party clears, are continuously conducting in the un-seized state of the link circuit. Pulses P2 are intermediate to pulses delivered from the originating pulse gate tube OPG, and whereas each of the latter pulses causes tubes B1 and B2 to be conducting and non-conducting respectively, the reverse takes place due to each P2 pulse. The previously mentioned 150 ms. delay circuit ensures that the latter will remain inoperative, and therefore no "B" pulse is produced, until the calling subscriber clears as evidenced by a prolonged interruption of output pulses from tube OPG. The generation of the "B" pulse and its effect will be described in due course.

Meantime, upon the conduction of tube FC due to the first pulse from the originating pulse gate tube OPG, tube PB is primed and then fires to the next pulse at lead P1 (400 p.p.s.). Tube PB extinguishes tube RPB and primes the self-extinguishing pulse repeater tube LPR24 which thereupon responds to the pulses at lead P1 in preparation for the generation of a "B" pulse by tube LPR25. Tube FC is also effective in applying a positive pulse to the trigger electrodes of the "C" tubes (C1 and C2) relevant to both registers, so that the one which has been primed by the register allotter RA is fired, and this primes the partner "D" tube (D1 or D2). In the present example where register REG1 is to be used, tube C1 is fired and tube D1 is primed. The firing of register-connector tube C1 is also operative upon the register allotter as already described. Moreover tube C1 is effective in the register in priming tube CF (Fig. 10), the latter being then rendered conducting by a pulse from tube RPR12 which is fired every 2.5 ms. by its P1 and PHT1 supplies. Tube CF extinguishes tube SDA which removes the priming potential from tube RPR12 and extinguishes the normally conducting diode RG2. The extinguishing of tube RG2 causes thermionic tubes RV7 and RV6 to become non-conducting and conducting respectively, whereupon the latter connects H.T. to the anode of the register-connector tube D1 over a winding of transformer TR3. Tube CF also fires diode RG1 to make thermionic tube RV2, in the register, responsive to line intelligence pulses (equivalent ONP pulses) obtained from the cathode of tube C1. Meantime tube FC in the link circuit also causes tube PDA to be fired. This extinguishes tube PD, by the mutual extinguishing process and at the same time primes the latter tube to enable it to fire again on the next pulse at lead P1. Thereupon the tube PD extends a positive pulse to the trigger electrodes of tubes D1 and D2. Since in the present example, tube D1 has received anode H.T. from tube RV6 in the register and has been primed by tube C1, it now fires. With tubes C1 and D1 fired a two-conductor path is provided between the link circuit and the register.

It is to be noted that the trigger electrodes of the self-extinguishing pulse repeater tubes LPR22 and LPR23 are each connected to the cathode load of the relevant D tube over two paths, one including a resistor and the other a capacitor. When the relevant "D" tube (D1 or D2) is fired a pulse and bias potential is extended to the appropriate pulse repeater tube but the time constant of the two paths over which the two potentials are applied to the pulse repeater tube differ to such an extent that the pulse precedes the bias and accordingly the pulse repeater remains unfired, but the primed condition persists. Thus in the present call, tube LPR22 is primed.

With reference to the link circuit, it has been assumed in the previous description that certain of the tubes were in a conducting condition prior to seizure, and an explanation will now be given as to how conduction was effected, particularly when the exchange is first switched into service. Tube PD is rendered conducting by a P1 pulse, and tubes B2 and B3 are normally conducting due to the effect of P2 pulses. In the first instance, when a start pulse is connected to lead SP after the supply is initially connected to the exchange, tube PBA (Fig. 3) which is not otherwise employed is fired to prime tube LPR24. This tube is then fired by a P1 pulse (400 p.p.s.) and a positive pulse derived from its cathode load fires the self-extinguishing pulse repeater tube LPR25 which is primed by tube B3. Tube LPR25 produces a so-called "B" pulse at lead BP and this fires tubes PPN and RPB, the latter extinguishing tube PBA, which is in parallel with tube PB. With neither tube PBA nor PB conducting, tube LPR24 is disabled. The "B" pulse also fires tube OSC in the link circuit sequence counter and this, through the intermediary of tube LPR16, fires tube CAB. Thus of the tubes mentioned, tubes PD, B2, B3, PPN, RPB and CAB are conducting when the exchange is initially introduced into service, and it will be seen that the same conditions will be brought about each time the link circuit becomes idle.

Continuing now with the description subsequent to the connection of the seized link circuit to register REG1, positive pulses at 15 ms. intervals, and corresponding to pulses ONP from the calling line circuit, are applied by tube LPR19 (Fig. 2) to the originating pulse gate tube OPG which therefore injects positive pulses into the anode circuit of the fired "C" tube (C1) by way of transformer TR1, the gate tube also applying pulses to tube B1 to inhibit the so-called "B" pulse. Each pulse transmitted to tube C1 causes an increase in current through the tube and this is reflected in the input to the amplifier comprising tubes RV2 and RV3 in the register. Amplified positive pulses (corresponding to line circuit pulses ONP) are therefore extended to tube RPR1 in the register sequence control counter RSCC and to the "A" and "C" pulse producing element ACG which is also in the register.

The register sequence control counter RSCC essentially comprises a number of mutually extinguishing count tubes HP, PTU, STD and so on, and a number of self-extinguishing pulse repeater tubes RPR1, RPR2 and the like which exercise control of the count tubes to condition them according to the progress of the call. In the idle condition of the register, the home position count tube HP is conducting and its cathode potential primes tube RPR1. The first pulse (repeated ONP pulse) delivered by tube RV3, fires the self-extinguishing pulse-repeater tube RPR1 which causes tube PTU to conduct. Tube PTU extinguishes tube HP, primes RPR2 and also primes the start tubes TCS and UCS in the tens and units digit counters TDC and UDC respectively.

The "A" and "C" pulse element of the register, which receives all pulses produced by tube RV3, i.e. calling line intelligence pulses, comprises three pairs of tubes, the tubes of each pair being mutually extinguishing. One tube of each pair, namely AC1, AC4 and AC5, receives trigger pulses from tube RV3, whereas the other tubes receive trigger pulses from the source P2. Both types of pulses, at this juncture, recur at 15 ms. intervals but, as already outlined, pulses of one type are displaced substantially 7.5 ms. with respect to the other. Prior to reception of the first pulse from tube RV3, tubes AC2, AC3 and AC6 are conducting and their partners are extinguished, but when the first of said pulses occurs, tubes AC1 and AC4 conduct and tubes AC2 and AC3 are extinguished. Tubes AC5 and AC6 remain unaffected due to the priming delay circuit (100 ms.) associated with the trigger of tubes AC5. Upon tube AC4 conducting, a so-called "A" pulse is produced ineffectually at lead AP.

In the period preceding dialling by the calling subscriber, the conditions of tubes AC1 and AC2 alternate, the first being fired for 7.5 ms. by each pulse from tube RV, and the second being fired for 7.5 ms. by each P2 pulse. During this period the 10 ms. delay circuit, associated with the trigger of tube AC3, is energised while tube AC2 conducting, but is rapidly reset, due to the rectifier, before becoming effective, when tube AC2 is extinguished. Consequently so long as there is no extended interval between successive line intelligence pulses from tube RV3, tube AC3 cannot be fired by a P2 pulse. Therefore tube AC4 remains conducting so that the 100 ms. delay circuit to tube AC5 remains energised. After 100 ms. therefore, tube AC5 is primed and then fires due to a pulse from tube RV3. Thereupon tube AC5 produces a so-called "C" pulse (positive) at its output lead CP, and also extinguishes tube AC6 which remains unaffected by P2 pulses since tube AC3, in its present unfired state, does not provide a priming potential.

It follows, as regards the "A" and "C" pulse element ACG, that in the pre-dialling period tubes AC1 and AC2 regularly alternate their conditions, and tubes AC4 and AC5 are conducting whereas tubes AC3 and AC6 are non-conducting.

The initial "C" pulse at lead CP, is effective in firing start tubes TCS and UCS in the tens and units digits counters TDC and UDC, and therefore the pulse repeater tubes TRP1 and UPR1 are primed. The same "C" pulse is applied to the triggers of the self-extinguishing pulse-repeater tubes RPR2, RPR3 and RPR4 in the register sequence control. Of these tubes the first is primed by tube PTU and now fires to fire tubes RG3 and STD. Tube STD primes tube TDP which is to be concerned with the transmission of pulses to the tens digit counter. The diode tube RG3, upon momentarily firing, extends a firing pulse to the self-extinguishing pulse repeater tube RPR16 in the register. This tube delivers a negative pulse to the grid of tube RV4 and as a result the cathode-follower tube RV5 conducts. This tube has the rectifier-shunted primary winding of transformer TR3 as its cathode load, so that a positive pulse is injected in the anode circuit of register-connector tube D1 which is already conducting. Tube D1 is already priming the self-extinguishing pulse repeater tube LPR22, and the present increase in current through tube D1 causes tube LPR22 to fire, whereupon it applies a positive pulse to the trigger electrodes of the self-extinguishing pulse-repeater tubes LPR5, LPR6, LPR7 and LPR12 in the link circuit sequence control counter LSCC. Therefore tube LPR5, which is primed by tube SZ, is fired, and this fires tube DTO. The latter extinguishes tube SZ, energises a 10 secs. delay circuit associated with the trigger electrode of tube LPR10, and fires the diode LG8 which completes a path for the passage of dial tone from source DT to the grid of thermionic tube LV8. Tube LV8 is coupled to the calling subscriber's line circuit over transformer TRB, and the tone is therefore audible to the calling party.

It is to be noted that if register REG2 had been employed, tube LPR23 would have been fired instead of tube LPR22 in the present example. Since these tubes are in parallel the firing of the former would have produced the same results in the link circuit.

With tube SZ in the link circuit control extinguished, the 5 secs. delay circuit associated with the grid of tube LPR9 is reset, and it is to be noted that the particular delay circuit would only have become operative in causing tube LPR9 to conduct if neither register were connected to the link circuit within the prescribed period, due say to both registers being busy. Another delay circuit (10 secs.) now energised by tube DTO would only become effective to fire tube LPR10 in the event of an excessive delay in dialling of the first digit.

*Dialling into the register.*—The register incorporates a tens digit counter TDC and a units digit counter UDC, which are identically arranged, both being of the well-known pulse repeater type and comprising ten stages. Thus in the tens counter, mutually extinguishing tubes TC1, TC2 . . . TC10 are the count tubes proper, and tubes TPR1, TPR2 . . . TPR10 are the self-extinguishing pulse repeater tubes. The count tubes are individually associated with digit transfer or marking tubes TT1, TT2 . . . TT10. Likewise in the units digit counter, tubes UC1, UC2 . . . UC10 are the count tubes, tubes UPR1, UPR2 . . . UPR10 are pulse repeaters, and UT1, UT2 . . . UT10 are the digit transfer tubes. The self-extinguishing pulse repeater tubes TDP and UDP, controlled from the "A" pulse input leads AP, are the driving tubes for the tens and units counters respectively, and tubes CTC and CUC are included for eventually cancelling the counts. The cathodes of tubes TT1 to TT10 have load circuits in common with corresponding tubes in register REG2, and the output leads TX1 to TX10 therefrom are each connected to lead TX in ten subscribers' line circuits grouped in accordance with their tens digit designations. Thus lead TX1 serves subscribers "11 to 10," lead TX2 serves subscribers "21 to 20," and so on. Tubes UT1 to UT10 in both registers are similarly connected to common output leads TY1 to TY10 which are each terminated upon the TY leads of ten line circuits grouped according to their units digit designations so that lead TY1 is connected to line circuits numbered "11" to "01," and so on.

It will be recalled that the first "C" pulse, besides firing tube RPR2 (and consequently tubes RG3 and STD) in the register sequence control, fired tubes TCS and UCS associated with the tens and units digits counters. Thereupon tube TCS primes tube TPR1 and extinguishes tube CTC, the latter normally having been fired due to a previous cancellation of the count. The firing of tube UCS likewise primes tube UPR1 and extinguishes tube CUC.

Digital transmission from the calling subscriber's instrument is effected at 10 i.p.s. the loop "breaks" being nominally 66⅔ ms. As was described with reference to the subscriber's line circuit each "break" masks the transmission of four or possibly five repeated ONP pulses over the P tube to the link, and accordingly tube LPR19 and the originating pulse gate tube OPG therein remain unfired for a corresponding period. For the extended period (45 or 60 ms.) that tube OPG remains unfired, no pulses are injected into register-connector tube C1, and therefore no pulses are applied to the trigger electrodes of tubes AC1, AC4 and AC5 in the "A" and "C" pulse element ACG. Consequently the fired condition of tube AC2, brought about by a pulse at lead P2, persists for such a time as will allow tube AC3 to be primed over the 10 ms. delay circuit, and therefore the latter tube is fired by a P2 pulse. Tube AC3 extinguishes tube AC4 and ineffectually primes tube AC6 which is already conducting. After termination of the loop "break," pulses are again received at the inputs of tubes AC1, AC4 and AC5. The first input pulse fires the first two of these tubes and with the consequent extinguishing of tubes AC2 and AC3, the element ACG is back to its previous condition (i.e. tubes AC1 and AC2 alternating, and tubes AC4 and AC6 conducting). Upon tube AC4 being rendered conducting as just described, and this occurs once for each "break" (or more correctly for each "re-make") of the subscriber's dial, an "A" pulse is developed at the output lead AP which is connected, over individual capacitors, to the trigger electrodes of tubes TDP and UDP which are concerned with driving the units and tens digit counters respectively.

When the tens digit is being dialled, tube STD in the register sequence control is conducting so that the self-extinguishing pulse repeater tube TDP is primed, whereas tube UDP is not. Therefore positive pulses appropriate in number to the tens digit dialled are delivered simultaneously to the pulse repeater tubes TPR1 to TPR10. When the first pulse is received, tube TPR1 is in the primed condition due to conduction of tube TCS, and therefore the first pulse fires tube TPR1 which fires tube TC1. Tube TC1 extinguishes tube TCS and primes tube TPR2 in readiness for the latter to be fired by a possible second pulse, whereupon tube TPR2 would fire the "count-of-two" tube TC2, the latter duly extinguishing tube TC1. Each fired count tube primes its associated transfer tube TT1 . . . TT10. The counting process would continue stage-by-stage as outlined, until, at the end of the dialled digit, a count tube relevant to the digit remains conducting. Thus if digit "0" were dialled tube TC10 would be fired and transfer tube TT10 would be primed.

In the ensuing inter-digital pause, the pulse input (ONP equivalent pulses) to tubes AC1, AC4 and AC5 in the element ACG, persists, and alternate conduction of tubes AC1 and AC2 proceeds. The delay circuit connected to the trigger of tube AC3 prevents this tube from firing to extinguish tube AC4. When tube AC4 has been conducting for some 100 ms., tube AC5 is primed and is then fired by a pulse from tube RV3 and thereupon a "C" pulse is developed at lead CP, and moreover tube AC6 is extinguished.

The "C" pulse following dialling of the tens digit causes tube RPR3 in the register sequence control to be fired momentarily and this fires tubes SUD and RG4. Tube SUD primes tube RPR4, extinguishes tube STD to disable tube TDP, and primes tube UDP of the units digit counter. When diode tube RG4 is fired, it produces a current surge through the register-connector tube D1 and as a result tube LPR22 (link circuit) conducts momentarily to transmit a positive firing pulse to the self-extinguishing pulse-repeater tube LPR6 in the link sequence control counter. Thereupon tube LPR6 fires tube EFD which signifies that the first digit has been stored in the register. Tube EFD extinguishes tube DTO, and the 5 secs. delay circuit related to the trigger of tube LPR11 is energised, the delay circuit only becoming operative if an excessive delay occurs between the dialling of the first and second digits. The extinguishing of tube DTO disconnects dial tone and disables the 10 secs. delay circuit tied to the trigger of tube LPR10.

Dialling of the units digit duly takes place and is effective upon the "A" and "C" pulse circuit in the register along the lines described with respect to the tens digit, an "A" pulse being produced for every "break" of the subscriber's loop and a "C" pulse being produced after completion of transmission of the digit. Since tube UDP in the units digit counter UDC has been primed by the register sequence control after completion of the tens digit, it fires due to each units digit "A" pulse and so the pulses are repeated to tubes UPR1 to UPR10. Tube UCS ensures that tube UPR1 strikes on receipt of the first pulse, to fire tube UC1, and the interconnections between tubes UPR1 to UPR10 and UC1 to UC10 ensure that the counter is advanced for each succeeding pulse. Thus if units digit "2" is dialled, tubes UPR2 and UC2 are fired, the latter priming transfer tube UT2.

The "C" pulse following reception of the units digit, is effective in firing the self-extinguishing pulse-repeater tube RPR4 in the register sequence control, and this fires tubes BDR and RG5. Tube RG5 upon firing momentarily causes a current surge through register-connector tube D1 whereupon tube LPR22 (link circuit) is pulsed to bring about conduction of tube LPR7 in the link circuit sequence control. This fires tube ESD which is indicative of the end of the second digit. Tube ESD extinguishes tube EFD to disable the delay circuit of tube LPR11, and also energises a 20 ms. delay circuit in the path to the trigger of tube LPR8, the latter delay circuit only becoming operative if the called line circuit is encountered busy when the register duly marks it. When tube BDR in the register is fired, it extinguishes tube SUD to disable the units digit counter, and moreover it primes tube RPR15 and fires diode RG7, the latter, as already explained, conditioning the six-stage extension, EFS, of the fast scanner (common control equipment) to be operated stage-by-stage following upon the current twelve-stage cycle of the fast scanner.

*Marking the called subscriber's line circuit.*—During the stage-by-stage operation of the fast scanner extension, a 5.0 ms. pulse of H.T. is produced successively at leads PHT4 and PHT5 in that order with a 2.5 ms. interval between them. The PHT4 and PHT5 supply leads are terminated on tubes 1RC and 2RC (Fig. 5) respectively in each link circuit, the first-mentioned lead being also terminated, in register REG1 upon tubes RPR13, RPR14 and RPR15 (Fig. 10) and upon the digit transfer tubes TT1 to TT10 and UT1 to UT10 (Fig. 15) also in that register, whereas lead PHT5 is similarly connected with respect to register REG2.

In the present call where register REG1 is employed the fired condition of the register-connector tube D1 provides for the priming of tube 1RC in the link circuit, but if the other register had been in use tube 2RC would have been primed. In the present case, when the PHT4 H.T. pulse occurs it fires tube 1RC until the H.T. is removed, the necessary triggering pulse being derived from PHT4 over a negative-pulse absorbing network. Tube 1RC thereupon causes thermionic tube LV3 to conduct and this primes the 100 pairs of P and H tubes terminated on the link circuit. Tube 2RC would have been similarly operative in the period of the PHT5 pulse, if register REG2 were in use.

In register REG1, the pulse at lead PHT4 causes tube RPR15 to be fired, the trigger receiving a pulse from lead PHT4 over a negative-pulse absorbing network. Thereupon a positive potential is obtained at the cathode output lead RMT and this causes the primed tens digit transfer tube to be fired. Thus in the case of the called number being "02," the transfer tube TT10, the anode of which is connected to lead PHT4, is fired. Accordingly a positive bias potential is connected over lead TX10 to lead TX of line circuits numbered "01" to "00." Also due to the firing of tube RPR15, a striking pulse is applied to tube PMU which extinguishes tube RPMU until the occurrence of the next P1 pulse (400 p.p.s.). Meantime tube PMU also primes tube RPR13 which fires due to the next P1 pulse. The restoration of tube RPMU to its normally conducting condition, extinguishes tube PMU, whereas the firing of tube RPR13 produces a positive pulse at output lead RMU and this is applied to the triggers of the units digit transfer tubes UT1 to UT10 which are receiving anode H.T. from PHT4. In the present example of a call to subcriber "02," tube UT2 has been primed and therefore now fires to produce a positive potential at its cathode output lead TY2 which is connected to lead TY in line circuits numbered "12" to "02."

The application of a positive potential to lead TY whilst the positive potential is also present at lead TX completes the co-ordinate marking of the called line circuit "02." As already explained, if the marked line circuit is idle, it causes the common control equipment to produce a "Z" pulse and applies a positive pulse to the triggers of the ten pairs of related P and H tubes in the multiple. The marking of the line circuit and its response occur in the period of H.T. from source PHT4 during which, as already mentioned, the 100 pairs of P and H tubes relevant the present link circuit using register REG1 are primed. Accordingly one pair of said tubes, corresponding to link circuit LC1 and the called line circuit are now fired, and these tubes together with the speech tube SP, fired by tube H, complete the connection. Since the calling and called subscribers' line circuits are now connected to the link circuit it follows that a connection is established between the two line circuits.

Whilst the pulsed H.T. source PHT4 is still effective, the previously mentioned "Z" pulse is applied over lead ZP to the trigger of tube RPR14 in the register. Therefore tube RPR14 conducts and so fires tube RR, which extinguishes tube BDR and energises the 100 ms. delay circuit associated with the trigger of tube RPR7. Tube BDR extinguishes tube RG7. The last-mentioned delay circuit duly becomes operative in priming tube RPR7 which fires on the next P1 pulse. Incidentally, tube RPR8, in parallel with tube RPR7 and arranged to be fired momentarily from a start pulse over lead SP after power supply has been initially connected to the exchange, is included so that when it is so fired, a so-called "Y" pulse is developed to set the register sequence control ready for use i.e. with tube HP conducting. However the present firing of tube RPR7 renders tubes RG6 and YPP conducting.

Upon diode tube RG6 firing for a short period, a current surge is again passed through register-connector tube D1 and therefore tube LPR22 again fires momentarily to extend a pulse to the self-extinguishing tube LPR12 in the link circuit sequence control. Since tube LPR12 is primed by tube ESD at this juncture, it is now fired, and causes tube RG to conduct. Thereupon tube RG primes tubes LPR18 (Fig. 2), PAR, LPR13 and LPR15, and extinguishes tube ESD which disables the 20 ms. delay circuit in the trigger circuit of tube LPR8.

At this same time, within the register sequence control, the firing of tube YPP primes the self-extinguishing pulse-repeater tube RPR11 which fires on the next P1 pulse (400 p.p.s.). Tube RPR11 produces a positive pulse (a so-called "Y" pulse) at its cathode output lead YP. This pulse fires the home position tube HP of the register sequence control and so tube YPP is extinguished. The "Y" pulse also fires tube SDA together with tubes CTC and CUC (Fig. 15), the last two remaining fired and extinguishing the relevant digital count tubes TC10 and UC2 so that, when the H.T. is removed from the source PHT4, the transfer tubes TT10 and UT2 are extinguished to remove the co-ordinate marking from the called subscriber's line circuit. When tube SDA conducts, tube RPR12 is primed and diode RG2 is fired, the latter causing tube RV6 to be cut-off through the intermediary of tube RV7. With tube RV6 cut-off, the anode H.T. for register-connector tube D1 is removed and so the latter is extinguished. The firing of tube SDA additionally extinguishes tube CF which then extinguishes tube RG1 (Fig. 9) to back-off tube RV2. With tube SDA fired, tube RPR12, supplied from sources PHT1 and P1, proceeds to fire 400 times a second but tube CF does not fire again, because its priming condition has meantime been removed by the extinguishing of the register-connector tube C1. The extinguishing of tube C1 will be described later.

When H.T. ceases at source PHT4, tubes RPR13, RPR14 and RPR15 together with transfer tubes TT10 and UT2 are extinguished, and so the register, is ready for use on another call.

With regard to the marking of called subscribers' line circuits by the register, it is important to note that the utilisation of pulsed H.T. sources PHT4 and PHT5 in registers REG1 and REG2 respectively, ensures that if the two registers are ready to mark at the same time, the markings are effected in the relevant successive H.T. pulse periods. Moreover said H.T. sources are operative, one in each of the two link circuits which happen to be using said registers, to fire tube 1RC or 2RC therein according to the register employed by it. Tube LV3, in the link circuit using register REG1, fires during the PHT4 period to prime the 100 pairs of P and H tubes relevant to that link circuit, whereas the similar tube in the link circuit using register REG2, fires during the PHT5 period, to prime the multiple tubes of that link circuit. From the foregoing it will be seen that the sequential marking of the line circuits by the two registers, and the sequential priming of sets of multiple tubes P and H by the two link circuits, ensures that when two registers are ready to mark at the same time, each calling link circuit is connected to the appropriate called line circuit.

Reverting to the condition of the link circuit after the idle subscriber's line circuit has been marked by the register, as already mentioned tube RG (Fig. 5) is fired and tubes LPR18, PAR, LPR13 and LPR15 are primed. The latter which is self-extinguishing, is fired momentarily by a P1 pulse (400 p.p.s.) whereupon a positive pulse, derived from its cathode load, fires tube CAB. This extinguishes tube CA, and also fires diode LG4 which causes tube LV1 to conduct. Thereupon tube LV2 is extinguished to remove the H.T. from the anodes of tubes C1 and C2. In the present example tube C1 is extinguished and therefore the register which was employed (REG1) is marked idle in the register allotter. Tube LPR18 (Fig. 2) has its anode and cathode supplied from source PHT7 and P5 respectively, and from what has already been said about these sources it will be appreciated that tube LPR18, now primed by tube RG, will fire at 30 ms. intervals during the "On" periods of each ringing cycle, to inject positive pulses into the anode circuit of the H tubes by way of thermionic tube LV11 and transformer TR2. It has already been mentioned that H.T., from a source not shown, is connected over lead RHT to tubes RGC in the line circuits, for each of said "On" periods. This H.T. supply and the pulse transmitted over the H tube of the called line circuit, cause interrupted ringing current to be connected to the subscriber's bell, the speech path between the calling and called line circuits also making ringing current audible to the caller.

Meantime in the link circuit, tube PAR (Fig. 5), primed by tube RG, is fired by a P1 pulse (400 p.p.s.) and extinguishes the normally conducting tube OSCA whilst also priming tube AR. The latter derives its anode H.T. supply from a source ARHT having its H.T. periods "antiphase" with respect to those of the ringing cycle source RHT i.e. lead ARHT is at H.T. during "Off" periods of the latter. The P1 pulses to the trigger of tube AR enable the tube to be fired for said "Off" periods and accordingly the terminating pulse gate tube TPG (Fig. 2) is primed for these periods.

*Called subscriber answers.*—When this takes place, the called line circuit repeats the terminating negative pulses TNP (occurring at 60 ms. intervals) over the P tube of the multiple and these are effective upon tube LPR19 in producing corresponding positive pulses at its cathode, said pulses being displaced with respect to those consequent upon the ONP pulses from the calling line circuit. However the present pulses which are applied to the trigger of the terminating pulse gate tube TPG, each occur when H.T. is on lead PHT7 serving the anode of said tube. Thus tube TPG is fired at 60 ms. intervals during the periods when tube AR is fired (ringing "Off" periods).

When fired, tube TPG applies a positive firing pulse to tubes FP2 and FP4 in the "F" pulse generating circuit FG, and therefore tubes FP1 and FP3, normally conducting and controlled from pulse source P7 (15 ms. intervals), are extinguished. With tube FP1 non-conducting, the 150 ms. delay circuit connected to the trigger of tube FP3 is disabled so that the latter is non-responsive to pulses at lead P7, and therefore tube FP4 remains conducting. With tube FP4 conducting, the 300 ms. delay circuit serving tube LPR26 is energised, and duly conditions tube LPR26 to be fired by a P1 pulse, tube LPR26 having its anode supplied with H.T. over lead ARHT during the "Off" periods of the ringing.

When tube LPR26 fires, a so-called "F" pulse is produced at its cathode output lead FP, and this fires tube LPR13 which is primed by tube RG. Tube LPR13 fires tube SA which extinguishes tube RG. Thereupon tube RG removes priming potential from tubes PAR, LPR13, LPR15 and LPR18. The effect upon the latter is to terminate ringing, and the conversation between the parties can then proceed. Tube SA also primes tube SAA which fires due to the next P1 pulse. Tube SAA thereupon extinguishes tube PAR which disables tube AR and this tube remains non-conducting. The latter removes the priming potential from the terminating pulse gate tube TPG which then remains extinguished and therefore the pulses to tubes FP2 and FP4 cease. Tube FP1 therefore remains conducting and after a delay of some 150 ms., tube FP3 conducts due to a P7 pulse and extinguishes tube FP4 which disables tube LPR26.

*Originating subscriber clears.*—When the originating subscriber clears at the end of the conversation, the gate for the ONP pulses in the line circuit is shut so that tube OPG in the link circuit is permanently extinguished and no further pulses are transmitted to tubes B1 and FC. Tube B2 fires on the next occurring P2 pulses and remains conducting. After a delay of approximately 150 ms., tube B3 is primed and then fires due to a P2 pulse, whereupon tube FC is extinguished and tube LPR25 is primed. Tube LPR25 is fired momentarily when tube LPR24 next fires due to a P1 pulse, and thereupon a "B" pulse is produced at its output lead BP. This fires tubes PPN and RPB of which the former extinguishes tube PPO to remove the priming from tube LPR19, whereas tube RPB extinguishes tube PB to disable tube LPR24. The "B" pulse also strikes tube OSC in the link sequence control to extinguish tube SA, to prime tubes OSCA and LPR16, and to energise the 200 ms. delay circuit associated with tube LPR14. Tube OSCA strikes due to a P1 pulse, and extinguishes tube SAA. Tube LPR16 also fires due to a P1 pulse to extend a pulse to the trigger of tube CAB, but this is ineffectual since the latter is already conducting in the present instance. The 200 ms. delay circuit duly becomes operative to permit the firing of self-extinguishing tube LPR14 by a P1 pulse, and thereupon a positive so-called "BD" pulse is produced at lead BDP. The "BD" pulse fires tube RL which extinguishes tube OSC and enables tube LPR1 to be fired. Thereupon tube FR is fired to extinguish tube RL, and the link sequence control is indicated as being idle again. The "BD" pulse also fires tube MSO (Fig. 2) which extinguishes tube MS and also fires the diodes LG10 and LG5. The diodes cause thermionic tubes LV7, LV9 and LV5 to be cut-off so that the SP, H and P tubes relevant to both subscribers are extinguished. Thus the link circuit is completely released ready for use on another call.

If the originating subscriber clears before the called subscriber answers or before dialling has been completed the "B" pulse is produced in the link circuit and the release of the link circuit is brought about substantially along the lines described by the firing of tube OSC. In the second case however, the register will be connected to the link circuit, and it is to be noted that the release of the register is initiated by the disconnection of H.T. from the "C" tube (C1) when tube CAB is fired by tube OSC through the intermediary of tube LPR17. The consequent extinguishing of tube C1 causes tube RV1 in the link sequence control to be cut-off momentarily, and this causes tube RPR10 to fire. Tube RPR10 develops a "Y" pulse which as already described restores the register to its idle state and extinguishes the link circuit "D" tube (D1).

*Called subscriber busy.*—When a busy subscriber's line circuit is marked by a register, the "Z" pulse generating element of the common control circuit is not activated and no "Z" pulse is forthcoming, so that tube RPR14 (Fig. 10) in the register sequence control is not fired nor is tube RR. Therefore a "Y" pulse is not generated nor is tube RG6 struck to cause the firing of tube LPR12 in the link sequence control. Consequently in the latter, tube RG is not fired and tube ESD is not extinguished to disable the 20 ms. delay circuit connected to the trigger of tube LPR8. The delay circuit duly becomes operative to enable tube LPR8 to be fired by a P1 pulse, and this strikes tube BY. Thereupon tube LPR17 (Fig. 5) is primed ready for striking by a P1 pulse, and the diode LG9 (Fig. 2) is fired to render busy tone, from the source BT, audible to the calling subscriber. When tube LPR17 conducts, it fires tube CAB to extinguish the register-connector tube C1, and this cuts-off tube RV1 in the register sequence control to initiate the setting of the register to its idle condition, the register-connector tube D1 being de-ionised in the process.

The clearance of the calling subscriber, after the called subscriber has been encountered busy, is effective upon the link in much the same manner as was described previously except that upon tube OSC firing, tube BY is extinguished.

*Both registers busy.*—When a link circuit has been initially seized by a calling subscriber, this condition is signified by tube SZ conducting in the link sequence control counter and this condition persists until the first "C" pulse is produced by the register taken into use by the link circuit. The "C" pulse causes tube LPR22 or LPR23 to advance the counter one position i.e. tube DTO conducts and tube SZ is extinguished. If however no register is available, the "C" pulse is not forthcoming and the 5 secs. delay circuit associated with tube LPR9 remains energised. Unless this delay circuit is disabled in the specified time by a register becoming available, tube LPR9 is duly fired by a P1 (400 p.p.s.) pulse. In this event the "busy" tube BY is fired, extinguishes tube SZ, permits tube LPR 17 (Fig. 5) to fire and causes busy tone to be returned to the caller. The firing of tube LPR17 causes H.T. to be removed from the register-connector "C" tubes.

*Subscriber fails to dial.*—Prior to the dialling of the first digit and after a register has been seized, the condition of the link circuit sequence control is that tube DTO is in the fired state, and in the register sequence control tube STD is fired. Tube DTO energises a 10 secs. delay circuit appropriate to tube LPR10, and if the caller fails to dial within the prescribed period, tube LPR10 is fired by a P1 pulse. Thereupon tube BY conducts, extinguishes tube DTO, causes busy tone to be returned to the caller, and enables tube LPR17 to fire whereupon the "C" tube, C1, is extinguished. Tube C1 then causes a "Y" pulse to be produced in the register and therefore the latter is released.

*Subscriber delays dialling second digit.*—When the first digit has been dialled tubes EFD and SUD in the link and register sequence controls respectively are fired, the former tube energising a 5 secs. delay circuit associated with the trigger of tube LPR11. If this delay circuit is allowed to mature due to the caller delaying dialling of the second digit, tube LPR11 is fired by a P1 pulse. Consequently the tube BY is rendered conducting, and the results are similar to those described in the previous example.

We claim:

1. In a telephone system, subscribers' line circuits, a plurality of sets of static switching devices for each subscriber's line circuit through which sets of static switching devices conversational and control paths are extended on the conduction of one set of static switching devices, first and second sources of pulses having different characteristics, means in each subscriber's line circuit responsive to a call origination for causing the conduction of one set of static switching devices to originate a connection from a subscriber's line circuit and for completing a path for the pulses from said first source through said subscriber's line circuit to the completed control path to enable controls appropriate to the originating condition of said subscriber's line circuit to be exerted over said completed control path and means in each subscriber's line circuit responsive to a call termination for causing the conduction of a set of static switching devices to terminate a connection on a subscriber's line circuit and for completing a path for the pulses from said second source through said subscriber's line circuit to the completed control path to enable controls appropriate to the terminating condition of said subscriber's line circuit to be exerted over said completed control path.

2. In a telephone system, subscribers' line circuits, a plurality of sets of static switching devices for each subscriber's line circuit through which sets of static switching devices conversational and control paths are extended on the conduction of one set of static switching devices, first and second pulse sources for delivering pulses having different characteristics, first and second gate circuits in each subscriber's line circuit, means in each subscriber's line circuit responsive to a call origination for causing the conduction of one set of static switching devices to extend a connection from said subscriber's line circuit and for completing a path from said first source of pulses through said first gate circuit to the completed control path to enable controls appropriate to the originating condition of said subscriber's line circuit to be exerted over said completed control path, means in each subscriber's line circuit responsive to a call termination for causing the conduction of one set of static switching devices to extend a connection to said subscriber's line circuit for completing a path from said second source of pulses through said second gate circuit to the completed control path to enable controls appropriate to the terminating condition of said subscriber's line circuit to be exerted over said completed control path.

3. A telephone system comprising subscriber's line circuits, a plurality of link circuits provided in common to all said subscribers' line circuits, a plurality of multipled sets of static switching devices provided for each subscriber's line circuit through which sets of static switching devices when conducting conversational and control paths are completed between a subscriber's line circuit and different link circuits, first and second sources of recurrent non-coincident pulses, first and second gate circuits in said subscriber's line circuits, third and fourth gate circuits terminating the control paths in said link circuits, means responsive to the origination of a connection from a calling subscriber's line circuit for opening said first gate circuit, common control means for causing the conduction of one set of static switching devices at said calling subscriber's line circuit to connect said calling subscriber's line circuit to one of said link circuits and for causing the conduction of one set of static switching devices at a called subscriber's line circuit to connect said called subscriber's line circuit to said one link circuit, means responsive to the conduction of said one set of static switching devices at said calling subscriber's line circuit for completing a path from said first source of pulses through the completed control path to said third gate circuit in said one link circuit, means responsive to the conduction of said one set of static switching devices at said called subscriber's line circuit for signalling said called subscriber, means responsive to the reply of the called subscriber for opening said second gate circuit in said called subscriber's line circuit to complete a path from said second source of pulses through said control path to said fourth gate circuit and means in said common control means for opening said third and fourth gate circuits in synchronism with the pulses delivered by said first and second sources respectively whereby the pulses incoming over said control path are separated by said third and fourth gate circuits.

4. A telephone system as claimed in claim 3 and comprising in addition circuit means in said link circuits for responding to pulses from said first source transmitted through said third gate circuit for maintaining the conversational and control paths between the calling and called subscribers' line circuits through said one link circuit until the transmission of pulses from said first source is terminated by the replacement of the calling subscriber's handset.

5. A telephone system as claimed in claim 4 and comprising in addition means for responding to interruptions in the transmission of pulses from said first source to represent digital signals and a delay device included in said circuit means for maintaining the conversational and control paths during said interruptions.

6. A telephone system as claimed in claim 3 and comprising in addition a source of ringing current connected to all subscribers' line circuits, means responsive to the conduction of said second set of static switching devices for transmitting ringing current from said source through said called subscriber's line circuit to the called subscriber's line and means responsive to pulses from said second source transmitted through said fourth gate circuit for terminating the transmission of ringing current to said called subscriber's line.

7. In a telephone system, subscribers' line circuits, at least one set of static switching devices for each subscriber's line circuit through which set of static switching devices when conducting conversational and control paths are extended, first and second sources of pulses having different characteristics, means in each subscriber's line circuit responsive to a call origination for causing the conduction of said one set of static switching devices to originate a connection from a subscriber's line circuit and for completing a path for the pulses from said first source through said subscriber's line circuit and one of the static switching devices of said set of static switching devices to the completed control path to enable controls appropriate to the originating condition of said subscriber's line circuit to be exerted over said completed control path, means in each subscriber's line circuit responsive to a call termination for causing the conduction of said one set of static switching devices to terminate a connection on a subscriber's line circuit and for completing a path for the pulses from said second source through said subscriber's line circuit and said one of the static switching devices of said set of static switching devices to the completed control path to enable controls appropriate to the terminating condition of said subscriber's line circuit to be exerted over said completed control path.

8. In a telephone system, subscribers' lines, line circuits for said subscribers' lines, equipment for scanning said subscribers' line circuits successively, a register responsive to dialled digits for extending markings to called subscribers' lines, a multi-stage pulse-operated distributing circuit in said scanning equipment, means for cyclically operating a predetermined number of stages of said distributing circuit to provide scanning pulses, means responsive to the completion of each cyclic operation of said predetermined number of stages for testing whether said register is in a condition to extend a marking to a called subscriber's line, means responsive when said register is in a marking condition for inhibiting the cyclic operation of said predetermined number of stages and for permitting the successive operation of the remaining stages of said distributing circuits to provide a period sufficient to enable the register to complete the marking operation and means responsive to the operation of the last of said remaining stages for initiating the cyclic operation of said predetermined number of stages.

9. In a telephone system, subscribers' lines, equipment for scanning said subscribers' lines successively, a plurality of registers responsive to dialled digits and operative to extend markings to called subscribers' lines, a multi-stage pulse-operated distributing circuit in said scanning equipment, means for cyclically operating a predetermined number of stages of said distributing circuit to provide scanning pulses, means responsvie to the completion of each cyclic operation of said predetermined number of stages for testing whether any of said registers are in a condition to extend a marking to a called subscriber's line, means responsive when at least one register is in a marking condition for inhibiting the cyclic operation of said predetermined number of stages and for permitting the successive operation of the remaining stages of said distributing circuit to provide a plurality of time periods equal in number to the number of registers, each of said time periods being sufficient to enable a register to complete the marking operation and means responsive to the operation of the last of said remaining stages for initiating the cyclic operation of said predetermined number of stages.

10. In a telephone system as claimed in claim 9, a source of regularly-spaced pulses, first pulse-repeating means normally effective to repeat pulses from said source to said predetermined number of stages, second pulse-repeating means for repeating pulses from said source to said remaining stages, switching means, means responsive to one of said registers being in a marking condition for operating said switching means and means responsive to the operation of said switching means for disabling said first pulse-repeating means and for enabling said second pulse-repeating means.

11. In a telephone system as claimed in claim 10, means responsive to the operation of the last of said remaining stages for disabling said second pulse-repeating means and enabling said first pulse-repeating means.

12. In a telephone system, subscribers' lines, line circuits for said subscribers' lines, scanning equipment for scanning said subscribers' line circuits successively, each of said line circuits provided with a plurality of sets of static switching devices to enable originating and terminating connections to be extended from and to the line circuit, first and second gate circuits in each line circuit to which pulses having different characteristics are applied, means in each line circuit responsive to the looping of the associated line to originate a connection for causing the conduction of one of said sets of static switching devices, means in each line circuit jointly responsive to the looping of the associated line and to the scanning of said line circuit by said scanning equipment for opening said first gate circuit whereby a path is completed for transmitting pulses through said first gate circuit and through one of said conducting sets of static switching devices, means in each line circuit responsive to markings extended thereto in a terminating connection for causing the conduction of one of said sets of static switching devices and for opening said second gate circuit whereby a path is completed for transmitting pulses through said second gate circuit and through one of said conducting set of static switching devices.

References Cited in the file of this patent

UNITED STATES PATENTS

| | | |
|---|---|---|
| 2,763,722 | Six et al. | Sept. 18, 1956 |
| 2,769,865 | Faulkner | Nov. 6, 1956 |
| 2,779,822 | Ketchledge | Jan. 29, 1957 |